(12) United States Patent
Chiba et al.

(10) Patent No.: US 9,993,766 B2
(45) Date of Patent: Jun. 12, 2018

(54) CARBON DIOXIDE CAPTURE APPARATUS AND METHOD OF CAPTURING CARBON DIOXIDE

(71) Applicant: Kabushiki Kaisha Toshiba, Minato-ku (JP)

(72) Inventors: Noriko Chiba, Yokohama (JP); Masatoshi Hodotsuka, Saitama (JP); Norihide Egami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 194 days.

(21) Appl. No.: 14/797,317

(22) Filed: Jul. 13, 2015

(65) Prior Publication Data

US 2016/0136566 A1 May 19, 2016

(30) Foreign Application Priority Data

Nov. 14, 2014 (JP) .................................. 2014-231751

(51) Int. Cl.
*B01D 53/14* (2006.01)
*B01D 53/18* (2006.01)

(52) U.S. Cl.
CPC ..... *B01D 53/1412* (2013.01); *B01D 53/1425* (2013.01); *B01D 53/1475* (2013.01);
(Continued)

(58) Field of Classification Search
CPC ........ B01D 2252/103; B01D 2257/504; B01D 53/00; B01D 53/14; B01D 53/1412;
(Continued)

(56) References Cited

U.S. PATENT DOCUMENTS

2008/0317651 A1 12/2008 Hooper et al.
2010/0218674 A1* 9/2010 Fujikawa ........... B01D 53/1425
                                                                95/42
(Continued)

FOREIGN PATENT DOCUMENTS

CN     102350180 A    2/2012
CN     101912718 B    5/2012
(Continued)

OTHER PUBLICATIONS

Office Action dated Apr. 4, 2016 in Australian Patent Application No. 2015205916.
(Continued)

*Primary Examiner* — Cabrena Holecek
(74) *Attorney, Agent, or Firm* — Oblon, McClelland, Maier & Neustadt, L.L.P.

(57) ABSTRACT

A carbon dioxide capture apparatus according to an embodiment includes an absorber and a stripper. The liquid level of the absorbing liquid within the absorber is measured by an absorber level gauge. A regulating liquid that contains water and is used to control the proportion of water contained in the absorbing liquid is stored in a regulating liquid tank. The flow rate of the regulating liquid to be supplied from the regulating liquid tank to the absorber or the stripper is controlled by a regulating liquid control valve. A controller controls the opening degree of the regulating liquid control valve based on the liquid level of the absorbing liquid measured by the absorber level gauge.

12 Claims, 7 Drawing Sheets

(52) U.S. Cl.
CPC ........ *B01D 53/18* (2013.01); *B01D 2252/103* (2013.01); *B01D 2257/504* (2013.01); *Y02A 50/2342* (2018.01); *Y02C 10/06* (2013.01)

(58) Field of Classification Search
CPC ............ B01D 53/1425; B01D 53/1475; B01D 53/18; Y02C 10/06
See application file for complete search history.

(56) References Cited

U.S. PATENT DOCUMENTS

| | | | | |
|---|---|---|---|---|
| 2011/0061533 | A1* | 3/2011 | Black | B01D 53/1406 95/195 |
| 2011/0195005 | A1 | 8/2011 | Hooper et al. | |
| 2012/0245737 | A1 | 9/2012 | Liu et al. | |
| 2013/0333559 | A1 | 12/2013 | Nakagawa | |
| 2014/0127102 | A1* | 5/2014 | Okuno | B01D 53/62 423/226 |

FOREIGN PATENT DOCUMENTS

| | | |
|---|---|---|
| CN | 102895860 A | 1/2013 |
| CN | 103657381 A | 3/2014 |
| EP | 0 945 162 A1 | 9/1999 |
| JP | 2001-252524 A | 9/2001 |
| JP | 2011-529 A | 1/2011 |
| JP | 2012-000538 | 1/2012 |
| JP | 2012-110841 A | 6/2012 |
| JP | 2012-179520 A | 9/2012 |
| JP | 2012-223661 A | 11/2012 |
| JP | 2013-208532 A | 10/2013 |
| JP | 2013-208533 | 10/2013 |

OTHER PUBLICATIONS

Office Action dated Sep. 13, 2016 in Australian Patent Application No. 2015205916.
Extended European Search Report dated Mar. 29, 2016 in Patent Application No. 15177031.0.

* cited by examiner

CARBON DIOXIDE CAPTURE APPARATUS AND METHOD OF CAPTURING CARBON DIOXIDE

CROSS-REFERENCE TO RELATED APPLICATIONS

This application is based upon and claims the benefit of priority from Japanese Patent Application No. 2014-231751, filed Nov. 14, 2014; the entire contents of which are incorporated herein by reference.

FIELD

Embodiments described herein relate generally to a carbon dioxide capture apparatus and a method of capturing carbon dioxide.

BACKGROUND

In recent years, a countermeasure against global warming has focused on a technique for carbon dioxide capture and storage (CCS). Such a technology includes a carbon dioxide capture system that uses an absorbing liquid to capture carbon dioxide contained in exhaust gas (i.e. combustion exhaust gas or process exhaust gas) generated in a thermal power plant, a steel plant, or an waste incineration facility, for example.

One of such carbon dioxide capture systems known in the art is an apparatus that has an absorber and a stripper. The absorber is configured to cause carbon dioxide to be absorbed in an absorbing liquid and generate a rich liquid, the carbon dioxide being contained in exhaust gas supplied by a blower. The stripper is configured to cause carbon dioxide-containing steam to be released from the rich liquid supplied from the absorber, regenerate the rich liquid, and generate a lean liquid. The lean liquid generated by the stripper is supplied to the absorber before a heat exchanger causes heat transfer between the lean liquid and the rich liquid. Moreover, a reboiler coupled to the stripper heats the rich liquid within the stripper using steam supplied from an external and allows carbon dioxide to be released from the rich liquid. Carbon dioxide-containing steam discharged from the stripper is cooled by a cooler and condensed to form condensed water. The condensed water is then separated from the carbon dioxide by a gas-liquid separator. In this manner, the carbon dioxide capture systems capture carbon dioxide contained in exhaust gas.

During the carbon dioxide capture apparatus being operated, the proportion of water contained in the absorbing liquid can fluctuate. For example, the proportion of water contained in the absorbing liquid can fluctuate due to a variation in the amount or flow rate of water contained in exhaust gas supplied to the absorber or due to a circulation flow rate of the absorbing liquid. Such a fluctuation could change the concentration of the absorbing liquid and deteriorate the performance of absorbing carbon dioxide and the rate of capturing carbon dioxide as well. To suppress the lower rate of capturing carbon dioxide, it is desirable that a variation in the proportion of water contained in the absorbing liquid be quickly restrained.

DETAILED DESCRIPTION

A carbon dioxide capture apparatus according to an embodiment includes an absorber and a stripper. The absorber causes carbon dioxide contained in exhaust gas to be absorbed in an absorbing liquid. The stripper causes the carbon dioxide to be released from the absorbing liquid, supplied from the absorber, containing the absorbed carbon dioxide. The stripper discharges carbon dioxide-containing gas. The liquid level of the absorbing liquid within the absorber is measured by an absorber level gauge. A regulating liquid that contains water and is used to control the proportion of water contained in the absorbing liquid is stored in a regulating liquid tank. The flow rate of the regulating liquid to be supplied by a regulating liquid supply driving unit from the regulating liquid tank to the absorber or the stripper is controlled by a regulating liquid control valve. A controller controls the opening degree of the regulating liquid control valve based on the liquid level of the absorbing liquid measured by the absorber level gauge.

A carbon dioxide capture method according to an embodiment is a method of capturing carbon dioxide by a carbon dioxide apparatus that includes an absorber and a stripper. The absorber causes carbon dioxide contained in exhaust gas to be absorbed in an absorbing liquid. The stripper causes carbon dioxide-containing gas to be discharged from the absorbing liquid, supplied from the absorber, containing the absorbed carbon dioxide. The carbon dioxide capture method includes: storing, in a regulating liquid tank, a regulating liquid for controlling the proportion of water contained in the absorbing liquid; measuring the liquid level of the absorbing liquid within the absorber; and supplying the regulating liquid from the regulating liquid to the absorber or the stripper. In the supplying the regulating liquid, the flow rate of the regulating liquid to be supplied from the regulating liquid tank to the absorber or the stripper is controlled in accordance with the measured liquid level of the absorbing liquid.

A carbon dioxide capture apparatus and carbon dioxide capture method according to each embodiment of the invention will now be described with reference to the accompanying drawings.

First Embodiment

First, a carbon dioxide capture apparatus and carbon dioxide capture method according to a first embodiment of the invention will be described with reference to FIG. 1.

Figure 1:
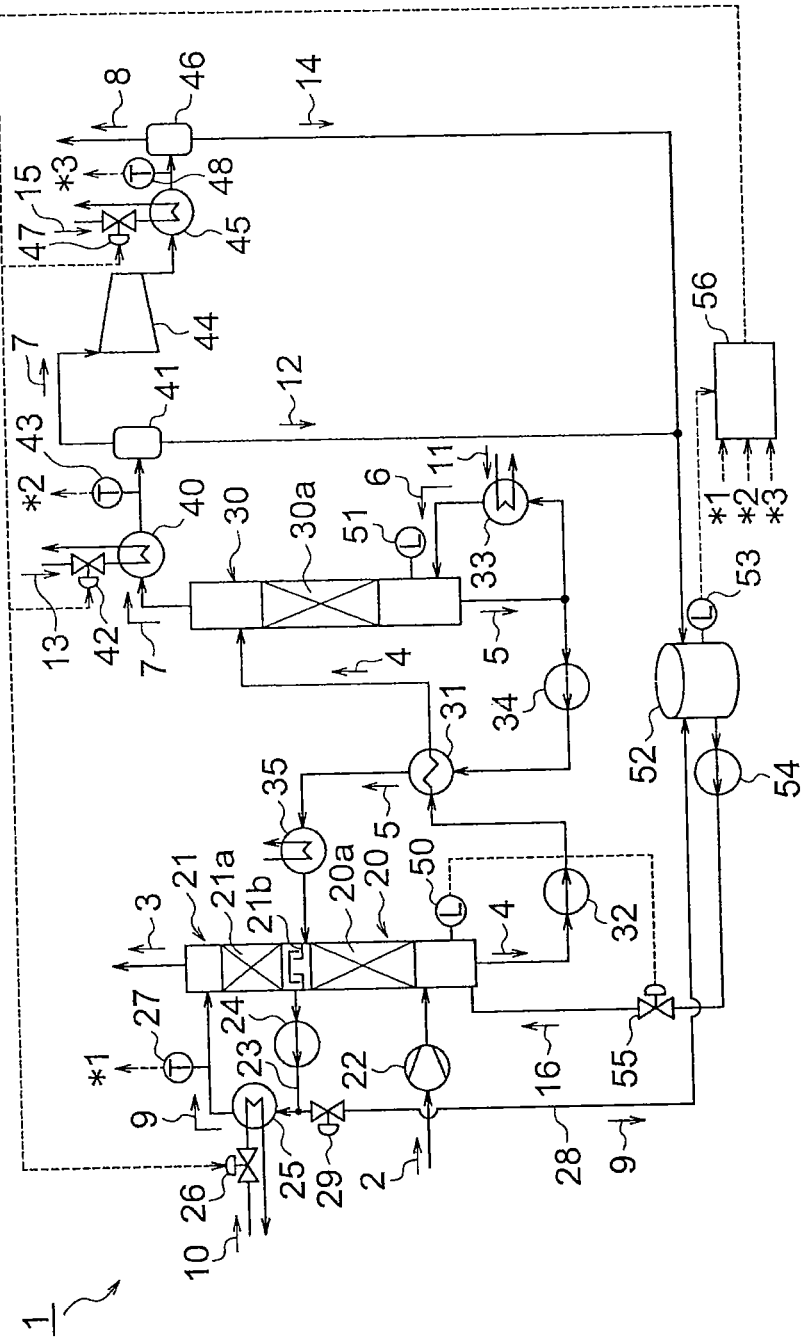
FIG. 1 is a diagram illustrating an overall configuration of a carbon dioxide capture apparatus according to a first embodiment of the invention.

As illustrated in FIG. 1, the carbon dioxide capture apparatus 1 includes an absorber 20 and a stripper 30. The absorber 20 is configured to cause carbon dioxide contained in exhaust gas 2 to be absorbed in an absorbing liquid. The stripper 30 is configured to cause the carbon dioxide to be released from the absorbing liquid that is supplied from the absorber 20 and contains the absorbed carbon dioxide, and regenerate the absorbing liquid. The exhaust gas 2 in the absorber 20 from which the carbon dioxide is absorbed in the absorbing liquid is discharged as carbon dioxide-free exhaust gas 3 from the absorber 20. On top of that, the carbon dioxide and steam are discharged as carbon dioxide-containing gas 7 (i.e. carbon dioxide-containing steam) from the stripper 30. The kind of the exhaust gas 2 supplied to the absorber 20 is not limited but may be combustion exhaust gas discharged from a boiler (not illustrated) of a thermal plant or process exhaust gas. The exhaust gas 2 may be supplied to the absorber 20 after being subjected to a cooling process as appropriate.

The absorbing liquid circulates between the absorber 20 and the stripper 30. The absorbing liquid absorbs carbon dioxide to turn into a rich liquid 4 in the absorber 20 and subsequently releases the carbon dioxide to turn into a lean liquid 5 in the stripper 30. The kind of the absorbing liquid is not limited but may be an amine aqueous solution, such as monoethanolamine and diethanolamine.

The absorber 20 includes a carbon dioxide capturer 20a (packed bed) configured to cause carbon dioxide in the exhaust gas 2 to be absorbed in the lean liquid 5. In the first embodiment, the carbon dioxide capturer 20a is a counter-current gas-liquid contact device. A washing unit 21 is provided at the upper portion of the absorber 20. The washing unit uses cleaning water 9 to clean the carbon dioxide-free exhaust gas 3 obtained by causing the carbon dioxide to be absorbed in the lean liquid 5. The washing unit 21 is provided above the carbon dioxide capturer 20a.

The exhaust gas 2 containing the carbon dioxide and discharged from the external (such as the aforementioned boiler) of the carbon dioxide capture apparatus 1 is supplied by a blower 22 to a lower portion of the absorber 20 and ascends toward the carbon dioxide capturer 20a within the absorber 20. Meanwhile, the lean liquid 5 is first supplied from the stripper 30 to a region between the carbon dioxide capturer 20a and the washing unit 21. The lean liquid 5 then diffuses and falls in the absorber 20 before being supplied to the carbon dioxide capturer 20a. In the carbon dioxide capturer 20a, the lean liquid 5 comes into contact with the exhaust gas 2, absorbs the carbon dioxide contained in the exhaust gas 2, and thereby turns into the rich liquid 4.

The rich liquid 4 is temporarily stored in the lower portion of the absorber 20 and discharged from the lower portion. The exhaust gas 2 that has comes into contact with the lean liquid 5 causes the carbon dioxide to be removed from the exhaust gas 2. Then, the exhaust gas 2 ascends as the carbon dioxide-free exhaust gas 3 toward the washing unit 21 within the absorber 20.

The washing unit 21 includes a component capturer 21a and a cleaning water storage unit 21b. The component capturer 21a captures an absorbing liquid component (component of the liquid component, for example, amine) from the carbon dioxide-free exhaust gas 3 after the cleaning water 9 and the carbon dioxide-free exhaust gas 3 are brought into contact. The cleaning water storage unit 21b provided under the component capturer 21a stores the cleaning water 9 that has flowed downward from the component capturer 21a. The washing unit 21 is coupled to a circulation line 23 that circulates the cleaning water 9. That is to say, a cleaning pump 24 arranged in the circulation line 21 extracts the cleaning water 9 stored in the cleaning water storage unit 21b, supplies the cleaning water 9 to a portion above the component capturer 21a, and thereby circulates the cleaning water 9. The cleaning water 9 supplied to the portion above the component capturer 21a diffuses and falls within the absorber 20 and is then supplied to the component capturer 21a.

A cleaning water cooler 25 provided in the circulation line 23 cools the cleaning water 9. The cleaning water 9 is cooled by the cleaning water cooler 25 and supplied to the component capturer 21a. A cleaning water cooling medium 10 (for example, cooling water) for cooling the cleaning water 9 is supplied to the cleaning water cooler 25 from an external. The flow rate of the cleaning water cooling medium 10 to be supplied to the cleaning water cooler 25 is controlled by a cleaning cooling medium control valve 26. On top of that, a cleaning water thermometer 27 provided in the circulation line 23 is used to measure the temperature (or the temperature of the cleaning water 9 discharged from the cleaning water cooler 25) of the outlet of the cleaning water cooler 25. Information about the temperature, measured by the cleaning water thermometer 27, of the outlet is transmitted to a controller 56 (described later) as indicated by *1 in FIG. 1. The controller 56 controls the opening degree of the cleaning cooling medium control valve 26 so that the temperature, measured by the cleaning water thermometer 27, of the outlet is equal to a desired temperature.

In the aforementioned configuration, the carbon dioxide-free exhaust gas 3 and the cleaning water 9 contact each other in the component capturer 21a of the washing unit 21, and the absorbing liquid component contained in the carbon dioxide-free exhaust gas 3 is absorbed into the cleaning water 9. This absorption cleans the carbon dioxide-free exhaust gas 3. The cleaning water 9, which has cleaned the carbon dioxide-free exhaust gas 3 in the component capturer 21a, flows downward from the component capturer 21a and is stored in the cleaning water storage unit 21b. The cooled cleaning water 9 in the component capturer 21a cleans the carbon dioxide-free exhaust gas 3, condensing the steam contained in the carbon dioxide-free exhaust gas 3. The condensed water is absorbed into the cleaning water 9, falls from the component capturer 21a, and is stored in the cleaning water storage unit 21b.

The absorbing liquid component dissolves in the cleaning water 9 at the time of the cleaning of the carbon dioxide-free exhaust gas 3. This dissolution can lead to a higher concentration of the absorbing liquid component within the cleaning water 9 upon the repetition of the cleaning so as to lower the cleaning performance of the washing unit 21. For this reason, the cleaning water 9 may be constantly replaced with new cleaning water to manage the quality of the cleaning water 9. Alternatively, the pH of the cleaning water 9 may be measured, and in the event that the pH exceeds a predetermined criterion value, the cleaning water 9 may be replaced with new cleaning water.

In the first embodiment, a branch line 28 that supplies the cleaning water 9 to a regulating liquid tank 52 (described later) branches from the circulation line 23. A cleaning water on/off valve 29 is provided in the branch line 28. If the amount of the cleaning water 9 stored in the cleaning water storage unit 21b of the washing unit 21 becomes larger than a predetermined criterion amount, the cleaning water on/off valve 29 opens to supply the cleaning water 9 to the regulating liquid tank 52 (described later). The cleaning water on/off valve 29 opens and closes independently of the liquid level, measured by a tank level gauge 53 (described later), of a regulating liquid 16 within the regulating liquid tank 52.

A heat exchanger 31 is provided between the absorber 20 and the stripper 30. A rich liquid pump 32 is arranged between the absorber 20 and the heat exchanger 31. The rich liquid pump 32 is used to supply the rich liquid 4 discharged from the absorber 20 through the heat exchanger 31 to the stripper 30. The heat exchanger 31 causes heat transfer between the rich liquid 4 to be supplied from the absorber 20 to the stripper 30 and the lean liquid 5 to be supplied from the stripper 30 to the absorber 20. The lean liquid 5 serves as a heating source to heat the rich liquid 4 to a desired temperature. In other words, the rich liquid 4 serves as a cooling source to cool the lean liquid 5 to a desired temperature.

The stripper 30 includes an absorbing liquid regenerator 30a (packed bed) configured to allow carbon dioxide to be released from the rich liquid 4. In the first embodiment, the absorbing liquid regenerator 30a is a countercurrent gas-liquid contact device.

A reboiler 33 coupled to the stripper 30 uses a heating medium 11 to heat the lean liquid 5 supplied from the stripper 30 and generates steam 6. The generated steam 6 is then supplied to the stripper 30. Specifically, the reboiler 33 receives a part of the lean liquid 5 discharged from a lower portion of the stripper 30. Furthermore the reboiler 33 receives high-temperature steam serving as the heating medium 11 from an external, such as a turbine (not illustrated). The lean liquid 5 supplied to the reboiler 33 is heated as a result of the heat transfer between the lean liquid 5 and the heating medium 11, generating the steam 6 from the lean liquid 5. The generated steam 6 is then supplied to the lower portion of the stripper 30. It is noted that the heating medium 11 is not limited to the high-temperature steam supplied from the turbine.

The steam 6, supplied from the reboiler 33 to the lower portion of the stripper 30, ascends toward the absorbing liquid regenerator 30a within the stripper 30. Meanwhile, the rich liquid 4 is first supplied from the absorber 20 to a portion above the absorbing liquid regenerator 30a. The rich liquid 4 then diffuses and falls in the stripper 30 before being sent to the absorbing liquid regenerator 30a. In the absorbing liquid regenerator 30a, the steam 6 comes into contact with the rich liquid 4, which releases carbon dioxide from the rich liquid 4. This gas-liquid contact and release consequently generates the lean liquid 5 and regenerates the absorbing liquid.

The generated lean liquid 5 is discharged from the lower portion of the stripper 30. The steam 6 that has come into contact with the rich liquid 4 contains carbon dioxide and is discharged as carbon dioxide-containing gas 7 from an upper portion of the stripper 30. The discharged carbon dioxide-containing gas 7 also contains steam.

A lean liquid pump 34 is provided between the stripper 30 and the heat exchanger 31. The lean liquid pump 34 supplies the lean liquid 5 discharged from the stripper 30 through the aforementioned heat exchanger 31 to the absorber 20. The heat exchanger 31 causes heat transfer between the lean liquid 5 to be supplied from the stripper 30 to the absorber 20 and the rich liquid 4 to be supplied from the absorber 20 to the stripper 30, and cools the lean liquid 5, as described above. On top of that, a lean liquid cooler 35 is disposed between the heat exchanger 31 and the absorber 20. A cooling medium, such as cooling water, is supplied from an external to the lean liquid cooler 35. The lean liquid cooler 35 further cools the lean liquid 5 that has been cooled by the heat exchanger 31 to a desired temperature.

The lean liquid 5 cooled by the lean liquid cooler 35 is first supplied to a region between the carbon dioxide capturer 20a of the absorber 20 and the cleaning water storage unit 21b of the washing unit 21. The lean liquid 5 subsequently comes into contact with the exhaust gas 2, absorbs the carbon dioxide contained in the exhaust gas 2, and thereby turns into the rich liquid 4. In the carbon dioxide capture apparatus 1, the absorbing liquid circulates while repeatedly switching from being the lean liquid 5 to being the rich liquid 4.

The carbon dioxide capture apparatus 1 illustrated in FIG. 1 further includes a first cooler 40 and a first gas-liquid separator 41. The first cooler 40 is configured to cool the carbon dioxide-containing gas 7 discharged from the upper portion of the stripper 30, condense steam, and generate first condensed water 12. The first gas-liquid separator 41 is configured to separate the first condensed water 12 generated by the first cooler 41 from the carbon dioxide-containing gas 7. In the similar way, the amount of water contained in the carbon dioxide-containing gas 7 is supplied, and the carbon dioxide-containing gas 7 is supplied to a compressor 44 (described later). The first condensed water 12 is supplied to the regulating liquid tank 52 (described later).

A first cooling medium 13 (for example, cooling water) for cooling the carbon dioxide-containing gas 7 is supplied from an external to the first cooler 40. The flow rate of the first cooling medium 13 to be supplied to the first cooler 40 is controlled by a first cooling medium control valve 42. Meanwhile, a first thermometer 43 provided between the first cooler 40 and the first gas-liquid separator 41 is used to measure the temperature of the outlet of the first cooler 40 (or the temperatures of the first condensed water 12 and carbon dioxide-containing gas 7 discharged from the first cooler 40). Information about the temperature, measured by the first thermometer 43, of the outlet is transmitted to the controller 56 (described later) as indicated by *2 in FIG. 1. The controller 56 controls the opening degree of the first cooling medium control valve 42 so that the temperature, measured by the first thermometer 43, of the outlet is equal to a desired temperature.

The carbon dioxide capture apparatus 1 includes the compressor 44, a second cooler 45, and a second gas-liquid separator 46. The compressor 44 compresses the carbon dioxide-containing gas 7 discharged from the first gas-liquid separator 41. The second cooler 45 further cools the carbon dioxide-containing gas 7 discharged from the compressor 44, condenses steam, and generates second condensed water 14. The second gas-liquid separator 46 separates the second condensed water 14 generated by the second cooler 45 from the carbon dioxide-containing gas 7. Furthermore, the compressor 44 compresses the carbon dioxide-containing gas 7 to a desired pressure and thereby increases the pressure of the carbon dioxide-containing gas 7. The carbon dioxide-containing gas 7 whose pressure has increased is cooled by the second cooler 45, the steam contained in the carbon dioxide-containing gas 7 is further condensed, and the amount of water contained in the carbon dioxide-containing gas 7 is reduced. In this way, the amount of water contained in the carbon dioxide-containing gas 7 is further reduced in the second gas-liquid separator 46. After being discharged as carbon dioxide gas 8 from the second gas-liquid separator 46, the carbon dioxide-containing gas 7 is supplied to a facility (not illustrated) where the gas 7 is stored or used. The second condensed water 14 is supplied to the regulating liquid tank 52 (described later).

A second cooling medium 15 (for example, cooling water) for cooling the carbon dioxide-containing gas 7 is supplied to the second cooler 45 from an external. The flow rate of the second cooling medium 15 to be supplied to the second cooler 45 is controlled by a second cooling medium control valve 47. A second thermometer 48 provided between the second cooler 45 and the second gas-liquid separator 46 is used to measure the temperature of the outlet of the second cooler 45 (or the temperature of the carbon dioxide-containing gas 7 and the second condensed water 14 discharged from the second cooler 45). Information about the temperature, measured by the second thermometer 48, of the outlet is transmitted to the controller 56 (described later) as indicated by *3 in FIG. 1. The controller 56 controls the opening degree of the second cooling medium control valve 47 so that the temperature, measured by the second thermometer 48, of the outlet is equal to a desired temperature.

An absorber level gauge 50 provided at the absorber 20 is used to measure the liquid level (absorber still level) of the rich liquid 4 stored in the lower portion of the absorber 20. A stripper level gauge 51 provided at the stripper 30 is used to measure the liquid level (stripper still level) of the lean liquid 5 stored in the lower portion of the stripper 30.

During the carbon dioxide capture apparatus 1 being operated, the proportion of water contained in the absorbing liquid can change. Specifically, the proportion of water contained in the absorbing liquid can fluctuate due to a variation in the amount or flow rate of water contained in the exhaust gas 2 to be supplied to the absorber 20 or due to a variation in a circulation flow rate of the absorbing liquid. For example, assume the amount of water contained in the exhaust gas 2 has increased. This can cause the water contained in the exhaust gas 2 to be absorbed in the absorbing liquid within the absorber 20, enlarging the proportion of water contained in the absorbing liquid. On the other hand, the proportion of water contained in the absorbing liquid can decrease if the amount of water contained in the carbon dioxide-free exhaust gas 3 discharged from the absorber 20 or the amount of water contained in the carbon dioxide gas 8 discharged from the second gas-liquid separator 46 is sufficiently large.

In the first embodiment, the liquid level of the lean liquid 5 within the stripper 30 is maintained at a constant level by controlling the flow rate of the rich liquid 4 to be supplied to the stripper 30 or the flow rate of the lean liquid 5 to be discharged from the stripper 30. Thus, a change in the proportion of water contained in the absorbing liquid circulating between the absorber 20 and the stripper 30 may vary the liquid level of the rich liquid 4 within the absorber 20. Specifically, the amount of water contained in the absorbing liquid circulating between the absorber 20 and the stripper 30 can be understand in accordance with the liquid level of the rich liquid 4 within the absorber 20.

In the first embodiment, water is supplied to the absorber 20 in accordance with the variation in the liquid level of the rich liquid 4. How it functions will now be described below.

As illustrated in FIG. 1, the absorber 20 is coupled to the regulating liquid tank 52 for storing the regulating liquid 16, that contains water, used to control the proportion of water contained in the absorbing liquid. In the first embodiment, the first condensed water 12 discharged from the aforementioned first gas-liquid separator 41, the second condensed water 14 discharged from the second gas-liquid separator 46, and the cleaning water discharged from the washing unit 21 are collected and stored as the regulating liquid 16 in the regulating liquid tank 52. A tank level gauge 53 configured to measure the liquid level of the regulating liquid 16 within the regulating liquid tank 52 is provided at the regulating liquid tank 52.

A regulating liquid pump 54 (regulating liquid supply driving unit) provided between the regulating liquid tank 52 and the absorber 20 is used to supply the regulating liquid 16 from the regulating liquid tank 52 to the absorber 20. The regulating liquid pump 54 supplies the regulating liquid 16 stored in the regulating liquid tank 52 to the lower portion (specifically, a region under the carbon dioxide capturer 20a) of the absorber 20.

The flow rate of the regulating liquid 16 to be supplied from the regulating liquid tank 52 to the absorber 20 is controlled by a regulating liquid control valve 55. The opening degree of the regulating liquid control valve 55 is controlled by the controller 56. Specifically, the controller 56 controls the opening degree of the regulating liquid control valve 55 based on the liquid level, measured by the absorber level gauge 50, of the absorbing liquid.

The controller 56 additionally controls the flow rate of the first condensed water 12 to be supplied to the regulating liquid tank 52, the flow rate of the second condensed water 14, and the flow rate of the cleaning water 9 respectively based on the liquid level, measured by the tank level gauge 53, of the regulating liquid 16. Specifically, the controller 56 controls, based on the liquid level of the regulating liquid 16 within the regulating liquid tank 52, the temperature of the outlet of the first cooler 40, the temperature of the outlet of the second cooler 45, and the temperature of the outlet of the cleaning water cooler 25. The temperature of the outlet of the first cooler 40 is controlled by controlling the opening degree of the first cooling medium control valve 42. Similarly, the temperature of the outlet of the second cooler 45 is controlled by controlling the opening degree of the second cooling medium control valve 47. The temperature of the outlet of the cleaning water cooler 25 is controlled by controlling the opening degree of the cleaning cooling medium control valve 26.

Action of the configuration according to the first embodiment will now be described below.

During the carbon dioxide capture apparatus 1 being operated, the first condensed water 12, the second condensed water 14, and the cleaning water 9 are captured and stored as the regulating liquid 16 in the regulating liquid tank 52. At this time, the regulating liquid 16 is collected from the first gas-liquid separator 41, the second gas-liquid separator 46 and the washing unit 21 in a well-balanced manner. The liquid level of the absorbing liquid within the absorber 20 is measured by the absorber level gauge 50. The flow rate of the absorbing liquid to be supplied from the regulating liquid tank 52 to the absorber 20 is controlled based on the measured liquid level of the absorbing liquid.

For example, if the liquid level of the rich liquid 4 within the absorber 20 becomes lower than a predetermined criterion level, information about the liquid level, measured by the absorber level gauge 50, of the rich liquid 4 is transmitted to the controller 56. The controller 56 accordingly increases the opening degree of the regulating liquid control valve 55. This operation can elevate the flow rate of the regulating liquid 16 to be supplied from the regulating liquid tank 52 to the absorber 20, and increase and restore the liquid level of the rich liquid 4 within the absorber 20 to the criterion level.

On the other hand, if the liquid level of the rich liquid 4 becomes higher than the predetermined criterion level, information about the liquid level, measured by the absorber level gauge 50, of the rich liquid 4 is transmitted to the controller 56. The controller 56 accordingly decreases the opening degree of the regulating liquid control valve 55. This operation can reduce the flow rate of the regulating liquid 16 to be supplied from the regulating liquid tank 52 to the absorber 20, decrease and restore the liquid level of the rich liquid 4 within the absorber 20 to the criterion level.

During the carbon dioxide capture apparatus 1 being operated, if the proportion of water contained in the absorbing liquid changes to fluctuate the liquid level of the rich liquid 4, the flow rate of the regulating liquid 16 to be supplied from the regulating liquid tank 52 to the absorber 20 can still be controlled in accordance with the variation in the liquid level of the rich liquid 4. This control enables the regulating liquid 16 of an appropriate amount to be supplied to the absorber 20, and the proportion of water contained in the absorbing liquid to be maintained at an appropriate level.

As described above, the flow rate of the regulating liquid 16 to be supplied from the regulating liquid tank 52 to the absorber 20 changes in accordance with the liquid level of the rich liquid 4 within the absorber 20. A possible variation of the liquid level of the regulating liquid 16 within the regulating liquid tank 52 depends on the flow rates of the first condensed water 12, second condensed water 14, and cleaning water 9 supplied to the regulating liquid tank 52. In the first embodiment, a variation in the liquid level of the regulating liquid 16 within the regulating liquid tank 52 is prevented through the following operations.

For example, if the liquid level, measured by the tank level gauge 53, of the regulating liquid 16 within the regulating liquid tank 52 becomes lower than a predetermined criterion level (reference water level), the controller 56 sets a temperature lower than a predetermined criterion temperature in the first thermometer 43. The controller 56 accordingly increases the opening degree of the first cooling medium control valve 42 so that the temperature, measured by the first thermometer 43, of the outlet of the first cooler 40 is equal to the temperature set in the first thermometer 43. This operation can elevate the flow rate of the first cooling medium 13 to be supplied to the first cooler 40, improve the cooling performance of the first cooler 40, and reduce the temperature of the outlet of the first cooler 40. Consequently, the amount of the first condensed water 12 to be generated can increase, thereby making the flow rate of the first condensed water 12 supplied to the regulating liquid tank 52 greater.

Similarly, the controller 56 sets a temperature lower than a predetermined criterion temperature in the second thermometer 48 and increases the opening degree of the second cooling medium control valve 47 so that the temperature, measured by the second thermometer 48, of the outlet of the second cooler 45 is equal to the temperature set in the second thermometer 48. This operation can increase the flow rate of the second cooling medium 15 to be supplied to the second cooler 45, improve the cooling performance of the second cooler 45, and reduce the temperature of the outlet of the second cooler 45. Consequently, the amount of the second condensed water 14 to be generated can increases, thereby making the flow rate of the second condensed water 14 supplied to the regulating liquid tank 52 greater.

Furthermore, the controller 56 sets a temperature lower than a predetermined criterion temperature of the cleaning water thermometer 27. The controller 56 accordingly increases the opening degree of the cleaning cooling medium control valve 26 so that the temperature, measured by the cleaning water thermometer 27, of the outlet of the cleaning water cooler 25 is equal to the temperature set in the cleaning water thermometer 27. This operation can elevate the flow rate of the cleaning water cooling medium 10 to be supplied to the cleaning water cooler 25, improve the cooling performance of the cleaning water cooler 25, and reduce the temperature of the outlet of the cleaning water cooler 25. Consequently, in the component capturer 21*a* of the washing unit 21, the amount of steam contained in the carbon dioxide-free exhaust gas 3 can be increased and the amount of the cleaning water 9 can be raised. As a result, the flow rate of the cleaning water 9 to be supplied to the regulating liquid tank 52 can increase. In the first embodiment, the cleaning water on/off valve 29 is provided at the regulating liquid 16. For this reason, the increased amount of the cleaning water 9 as in the aforementioned manner allows the amount of the cleaning water 9 stored in the cleaning water storage unit 21*b* to be greater and the cleaning water on/off valve 29 to be open.

On the other hand, if the liquid level of the regulating liquid 16 within the regulating liquid tank 52 becomes higher than the predetermined criterion level, the controller 56 sets a temperature higher than the predetermined criterion temperature in the first thermometer 43. The controller 56 accordingly decreases the opening degree of the first cooling medium control valve 42 so that the temperature, measured by the first thermometer 43, of the outlet of the first cooler 4 is equal to the temperature set in the first thermometer 43. This operation can lower the flow rate of the first cooling medium 13 to be supplied to the first cooler 40, reduce the cooling performance of the first cooler 40, and increase the temperature of the outlet of the first cooler 40. Thus, the amount of the first condensed water 12 to be generated can decrease, and as a result, the flow rate of the first condensed water 12 to be supplied to the regulating liquid tank 52 can decrease. The second cooling medium control valve 47 and the cleaning cooling medium control valve 26 is controlled in the similar manner, so as to reduce the flow rates of the second condensed water 14 and the cleaning water 9 respectively.

Even if the liquid level of the regulating liquid 16 within the regulating liquid tank 52 changes, the flow rates of the first condensed water 12, second condensed water 14 and cleaning water 9 supplied to the regulating liquid tank 52 can be controlled in accordance with the liquid level of the regulating liquid 16, and the regulating liquid 16 of an appropriate amount is stored in the regulating liquid tank 52. Specifically, if the liquid level of the regulating liquid 16 fluctuates, the liquid level of the regulating liquid 16 can be restored to the criterion level, making it possible to store the regulating liquid 16 of an appropriate amount in the regulating liquid tank 52 to control the proportion of water contained in the absorbing liquid.

According to the first embodiment the opening degree of the regulating liquid control valve 55 is controlled on the basis of the liquid level, measured by the absorber level gauge 50, of the rich liquid 4 within the absorber 20. This operation can control the flow rate of the regulating liquid 16 to be supplied from the regulating liquid tank 52 to the absorber 20 in accordance with the liquid level of the rich liquid 4, and supply water of an appropriate amount to the absorber 20. Thus, the proportion of water contained in the absorbing liquid can be appropriately controlled, so that a variation in the proportion of water contained in the absorbing liquid can be restrained. As a result, a decrease in the rate of capturing carbon dioxide can be suppressed. In addition, the regulating liquid 16 to be supplied to the absorber 20 is stored in the regulating liquid tank 52. If the liquid level of the rich liquid 4 decreases, the regulating liquid 16 can be quickly supplied to the absorber 20 and a variation in the proportion of water contained in the absorbing liquid can be quickly restrained.

In addition, according to the first embodiment, the controller 56 controls the temperature of the outlet of the first cooler 40, the temperature of the outlet of the second cooler 45, and the temperature of the outlet of the cooling water cooler 25 based on the liquid level, measured by the tank level gauge 53, of the regulating liquid 16. This operation can control the amount of the first condensed water 12 to be generated, the amount of the second condensed water 14 to be generated, and the amount of the cleaning water 9. Accordingly, the flow rates of the first condensed water 12, second condensed water 14, and cleaning water 9 supplied to the regulating liquid tank 52 can be controlled in accordance with the liquid level of the regulating liquid 16. The operation further allows the first condensed water 12 of an appropriate amount, the second condensed water 14 of an appropriate amount, and the cleaning water 9 of an appropriate amount to be supplied to the regulating liquid tank 52. Thus, the regulating liquid 16 of an appropriate amount can be stored in the regulating liquid tank 52. If the liquid level of the rich liquid 4 decreases, the regulating liquid 16 can be quickly supplied to the absorber 20.

Furthermore, according to the first embodiment, the controller 56 controls the opening degree of the first cooling medium control valve 42, the opening degree of the second cooling medium control valve 47, and the opening degree of the cleaning cooling medium control valve 26. This operation can control the flow rate of the first cooling medium 13 to be supplied to the first cooler 40, and the temperature of the outlet of the first cooler 40. Similarly, the operation can control the flow rate of the second cooling medium 15 to be supplied to the second cooler 45, and the temperature of the outlet of the second cooler 45. Thus, the flow rate of the cleaning water cooling medium 10 to be supplied to the cleaning water cooler 25 can be controlled and the temperature of the outlet of the cleaning water cooler 25 can be controlled.

The first embodiment describes the example in which the regulating liquid tank 52 collects the first condensed water 12, the second condensed water 14, and the cleaning water 9. Further in the example, the controller 56 controls the temperature of the outlet of the first cooler 40, the temperature of the outlet of the second cooler 45, and the temperature of the outlet of the cleaning water cooler 25 on the basis of the liquid level of the regulating liquid 16 within the regulating liquid tank 52. The first embodiment, however, is not limited to this example. Although the regulating liquid tank 52 collects the first condensed water 12, the second condensed water 14, and the cleaning water 9, the controller 56 may control at least one of the temperature of the outlet of the first cooler 40, the temperature of the outlet of the second cooler 45, and the temperature of the outlet of the cleaning water cooler 25. Even in this case, the regulating liquid 16 of an appropriate amount can be stored in the regulating liquid tank 52.

The first embodiment describes the example in which the first condensed water 12 supplied from the first gas-liquid separator 41, the second condensed water 14 supplied from the second gas-liquid separator 46, and the cleaning water 9 discharged from the washing unit 21 are collected as the regulating liquid 16 in the regulating liquid tank 52. The first embodiment, however, is not limited to this example; at least one of the first condensed water 12, the second condensed water 14, and the cleaning water 9 may be collected in the regulating liquid tank 52. The regulating liquid 16 in this case can also be stored in the regulating liquid tank 52. Alternatively, two of the first condensed water 12, the second condensed water 14, and the cleaning water 9 may be collected in the regulating liquid tank 52. In this case, the temperature of the outlet of a cooler corresponding to one of the two types of the water collected in the regulating liquid tank 52 may be controlled. Specifically, the controller 56 may control at least one of the temperature of the outlet of the first cooler 40 when the first condensed water 12 is collected in the regulating liquid tank 52, the temperature of the outlet of the second cooler 45 when the second condensed water 14 is collected in the regulating liquid tank 52, and the temperature of the outlet of the cleaning water cooler 25 when the cleaning water 9 is collected in the regulating liquid tank 52.

The first embodiment has described the example in which the regulating liquid 16 is supplied to the region under the carbon dioxide capturer 20a of the absorber 20 from the regulating liquid tank 52. The first embodiment, however, is not limited to this example; the regulating liquid 16 may be supplied to a region located between the carbon dioxide capturer 20a and the cleaning water storage unit 21b of the washing unit 21. In this case, the regulating liquid 16 may join the lean liquid 5 that has been discharged from the lean liquid cooler 35 but is to be supplied to the absorber 20, and then may be supplied to the absorber 20. In addition, the regulating liquid 16 may be supplied to the stripper 30. In this case, the regulating liquid 16 may be supplied to the lower portion (region located under the absorbing liquid regenerator 30a of the stripper 30) of the stripper 30 or supplied to the upper portion (region located above the absorbing liquid regenerator 30a) of the stripper 30.

Second Embodiment

A carbon dioxide capture apparatus and carbon dioxide capture method according to a second embodiment of the invention will now be described with reference to FIG. 2.

Figure 2:
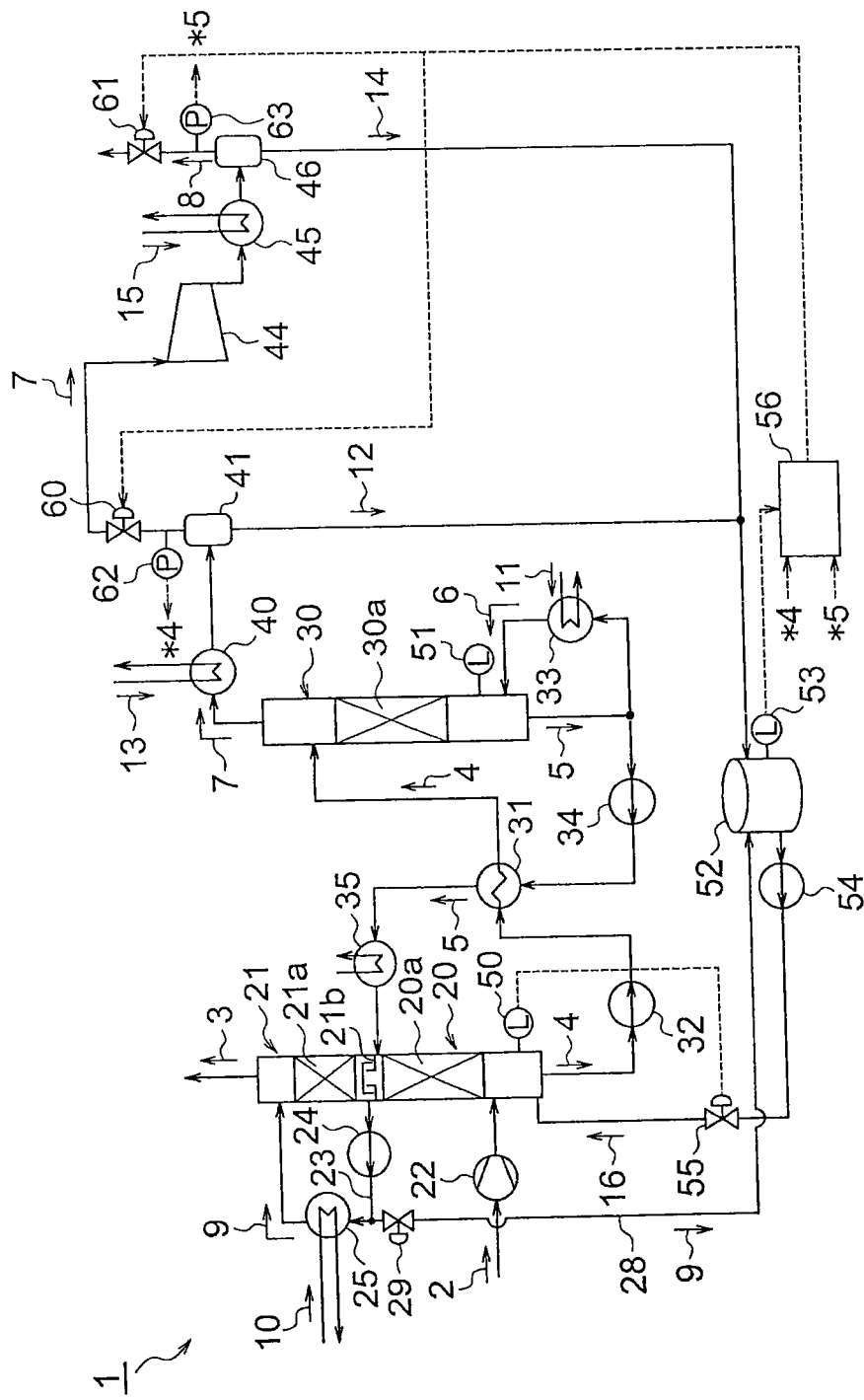
FIG. 2 is a diagram illustrating an overall configuration of a carbon dioxide capture apparatus according to a second embodiment of the invention.

In the second embodiment illustrated in FIG. 2, a controller controls a pressure within a first gas-liquid separator and a pressure within a second gas-liquid separator. This feature is mainly different from that in the first embodiment, but other configurations are substantially the same as those in the first embodiment illustrated in FIG. 1. Parts that are illustrated in FIG. 2 and the same as those in the first embodiment illustrated in FIG. 1 are indicated by the same reference numerals and symbols as those in the first embodiment illustrated in FIG. 1, and thus a detailed description thereof is omitted.

As illustrated in FIG. 2, the first condensed water 12 supplied from the first gas-liquid separator 41 and the second condensed water 14 supplied from the second gas-liquid separator 46 are collected and stored as the regulating liquid 16 in the regulating liquid tank 52.

A carbon dioxide capture apparatus 1 according to the second embodiment further includes a first pressure control valve 60 and a second pressure control valve 61. The first pressure control valve 60 is configured to control the flow rate of carbon dioxide-containing gas 7 to be supplied from the first gas-liquid separator 41 to the compressor 44. The second pressure control valve 61 is configured to control the flow rate of carbon dioxide gas 8 discharged from the second gas-liquid separator 46. The first pressure control valve 60 is provided between the first gas-liquid separator 41 and the compressor 44, while the second pressure control valve 61 is arranged on the downstream of the second gas-liquid separator 46.

A first pressure meter 62 provided between the first gas-liquid separator 41 and the first pressure control valve 60 is used to measure the pressure within the first gas-liquid separator 41. Information about the pressure measured by the first pressure meter 62 is transmitted to the controller 56 as indicated by *4 in FIG. 2. The controller 56 controls the opening degree of the first pressure control valve 60 so that the pressure to be measured by the first pressure meter 62 is equal to a desired pressure.

A second pressure meter 63 provided between the second gas-liquid separator 46 and the second pressure control valve 61 is used to measure the pressure within the second gas-liquid separator 46. Information about the pressure measured by the second pressure meter 63 is transmitted to the controller 56 as indicated by *5 in FIG. 2. The controller 56 controls the opening degree of the second pressure control valve 61 so that the pressure to be measured by the second pressure meter 63 is equal to a desired pressure.

The controller 56 according to the second embodiment controls the pressure within the first gas-liquid separator 41 and the pressure within the second gas-liquid separator 46 based on the liquid level of the regulating liquid 16 within the regulating liquid tank 52. The pressure within the first gas-liquid separator 41 is controlled by controlling the opening degree of the first pressure control valve 60. Similarly, the pressure within the second gas-liquid separator 46 is controlled by controlling the opening degree of the second pressure control valve 61.

If the liquid level of the regulating liquid 16 within the regulating liquid tank 52 becomes lower than the predetermined criterion level, the controller 56 sets to the first pressure meter 62 a pressure higher than a criterion pressure (reference pressure). The controller 56 then decreases the opening degree of the first pressure control valve 60 so that the pressure within the first gas-liquid separator 41 that is measured by the first pressure meter 62 is equal to the pressure the first pressure meter 62 set. This operation can reduce the flow rate of the carbon dioxide-containing gas 7 to be supplied to the compressor 44 from the first gas-liquid separator 41, and increases the pressure of the carbon dioxide-containing gas 7 within the first gas-liquid separator 41. Thus, a higher saturation temperature due to the increased pressure can raise the amount of the first condensed water 12 to be separated in the first gas-liquid separator 41, and consequently raise the flow rate of the first condensed water 12 to be supplied to the regulating liquid tank 52.

Similarly, the controller 56 sets to the second pressure meter 63 a pressure higher than the predetermined criterion pressure and decreases the opening degree of the second pressure control valve 61 so that the pressure within the second gas-liquid separator 46 measured by the second pressure meter 63 is equal to the pressure the second pressure meter 63 set. This operation can reduce the flow rate of the carbon dioxide gas 8 discharged from the second gas-liquid separator 46, and increase the pressure of the carbon dioxide gas 8 within the second gas-liquid separator 46. The higher pressure can raise the amount of the second condensed water 14 to be separated in the second gas-liquid separator 46, and consequently raise the flow rate of the second condensed water 14 to be supplied to the regulating liquid tank 52.

On the other hand, if the liquid level of the regulating liquid 16 within the regulating liquid tank 52 becomes higher than the predetermined criterion level, the controller 56 sets to the second pressure meter 63 a pressure lower than the predetermined criterion pressure. The controller 56 then increases the opening degree of the first pressure control valve 50 so that the pressure within the first gas-liquid separator 41 measured by the first pressure meter 62 is equal to the pressure the second pressure meter 63 set. This operation can increase the flow rate of the carbon dioxide-containing gas 7 to be supplied to the compressor 44 from the first gas-liquid separator 41, and reduce the pressure of the carbon dioxide-containing gas 7 within the first gas-liquid separator 41. The lower saturation temperature caused by the reduced pressure can decrease the amount of the first condensed water 12 to be separated in the first gas-liquid separator 41, and consequently decrease the flow rate of the first condensed water 12 to be supplied to the regulating liquid tank 52. The second pressure control valve 61 is controlled in the similar manner so as to reduce the flow rate of the second condensed water 14.

If the liquid level of the regulating liquid 16 within the regulating liquid tank 52 changes, the flow rates of the first and second condensed water 12 and 14 to be supplied to the regulating liquid tank 52 are still controlled based on the liquid level of the regulating liquid 16, and the regulating liquid 16 of an appropriate amount can be stored in the regulating liquid tank 52. Specifically, even if the liquid level of the regulating liquid 16 fluctuates, the liquid level of the regulating liquid 16 can be restored to the criterion level, and the regulating liquid 16 of an appropriate amount to control the proportion of water contained in the absorbing liquid can be stored in the regulating liquid tank 52.

According to the second embodiment, the controller 56 controls the pressure within the first gas-liquid separator 41 and the pressure within the second gas-liquid separator 46 based on the liquid level of the regulating liquid 16 measured by the tank level gauge 53. This operation can control the amount of the first condensed water 12 to be separated and the amount of the second condensed water 14 to be separated, further control the flow rates of the first and second condensed water 12 and 14 to be supplied to the regulating liquid tank 52 in accordance with the liquid level of the regulating liquid 16, and supply the first condensed water 12 and the second condensed water 14 both having an appropriate amount to the regulating liquid tank 52. The regulating liquid 16 of an appropriate amount can be accordingly stored in the regulating liquid tank 52. If the liquid level of the rich liquid 4 decreases, the regulating liquid 16 can be quickly supplied to the absorber 20, so that a variation in the proportion of water contained in the absorbing liquid can be quickly restrained.

In addition, according to the second embodiment, the controller 56 controls the opening degree of the first pressure control valve 60 and the opening degree of the second pressure control valve 61. This operation can control the flow rate of the carbon dioxide-containing gas 7 to be supplied to the compressor 44 from the first gas-liquid separator 41, and the pressure of the carbon dioxide-containing gas 7 within the first gas-liquid separator 41. In the similar way, the controller 56 can control the flow rate of the carbon dioxide gas 8 discharged from the second gas-liquid separator 46 and thus control the pressure of the carbon dioxide gas 8 within the second gas-liquid separator 46.

The second embodiment describes the example in which the first condensed water 12 and the second condensed water 14 are collected in the regulating liquid tank 52 and the controller 56 controls the pressure within the first gas-liquid separator 41 and the pressure within the second gas-liquid separator 46 based on the liquid level of the regulating liquid 16 within the regulating liquid tank 52. The second embodiment, however, is not limited to this example. Although the first condensed water 12 and the second condensed water 14 are collected in the regulating liquid tank 52, the controller 56 may control at least one of the pressure within the first gas-liquid separator 41 and the pressure within the second gas-liquid separator 46. The regulating liquid 16 of an appropriate amount in this case can also be stored in the regulating liquid tank 52.

The second embodiment has described the case in which the first condensed water 12 supplied from the first gas-liquid separator 41 and the second condensed water 14 supplied from the second gas-liquid separator 46 are collected as the regulating liquid 16 in the regulating liquid tank 52. The second embodiment, however, is not limited to this example; at least one of the first condensed water 12 and the second condensed water 14 may be collected in the regulating liquid tank 52. The regulating liquid 16 in this case can be stored in the regulating liquid tank 52 as well. In addition, the controller 56 may control at least one of the pressure within the first gas-liquid separator 41 when the first condensed water 12 is collected in the regulating liquid tank 52 and the pressure within the second gas-liquid separator 46 when the second condensed water 14 is collected in the regulating liquid tank 52.

Third Embodiment

A carbon dioxide capture apparatus and carbon dioxide capture method according to a third embodiment of the invention will now be described with reference to FIG. 3.

Figure 3:
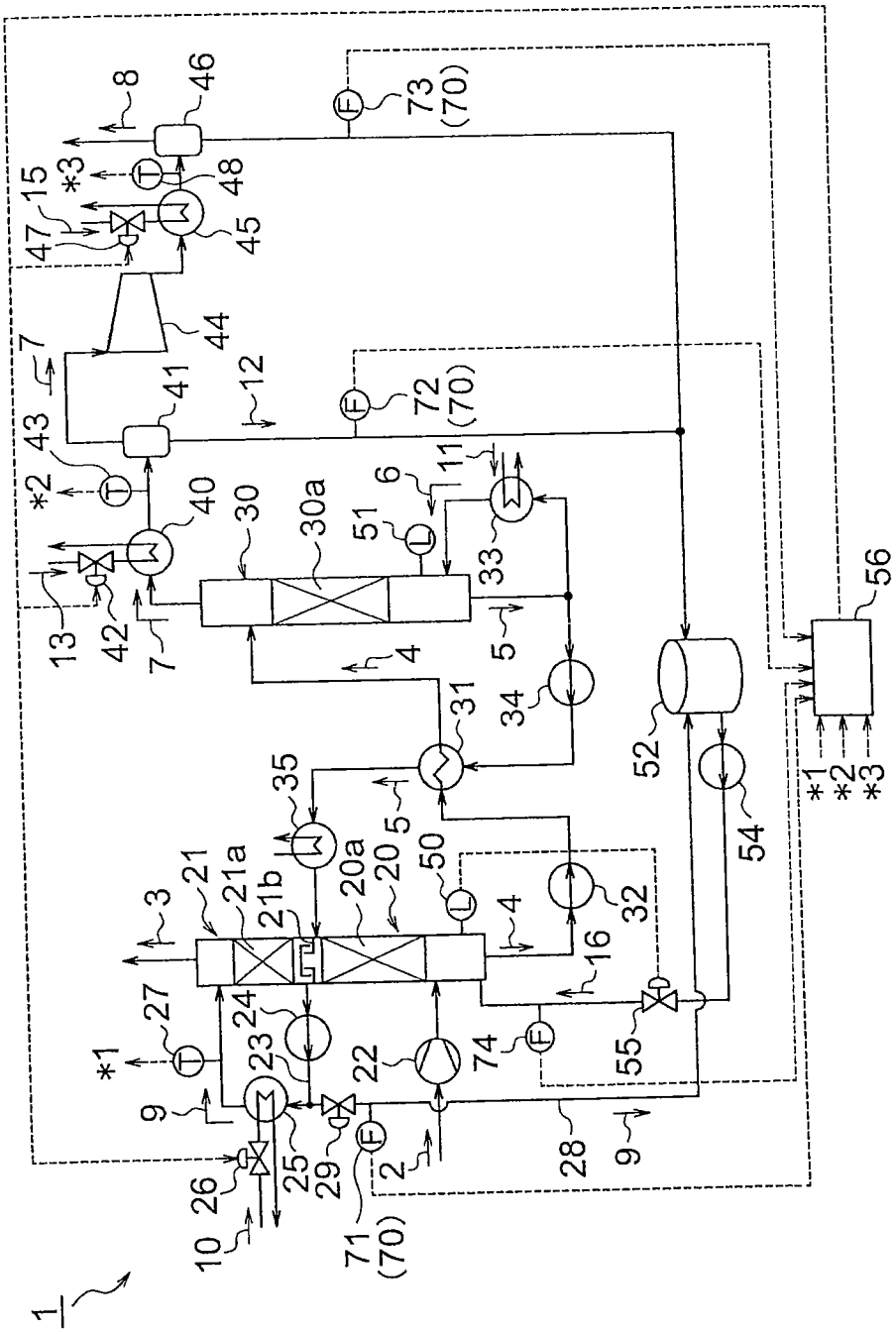
FIG. 3 is a diagram illustrating an overall configuration of a carbon dioxide capture apparatus according to a third embodiment of the invention.

In the third embodiment illustrated in FIG. 3, the temperature of the outlet of a first cooler, the temperature of the outlet of a second cooler, and the temperature of the outlet of a cleaning cooler are controlled based on the flow rate of the regulating liquid to be collected in the regulating liquid tank and the flow rate of the regulating liquid to be supplied to the absorber. This feature is mainly different from that in the first embodiment illustrated in FIG. 1, but other configurations are substantially the same as those in the first embodiment illustrated in FIG. 1. Parts that are illustrated in FIG. 3 and are the same as those in the first embodiment illustrated in FIG. 1 are indicated by the same reference numerals and symbols as in the first embodiment illustrated in FIG. 1. A detailed description thereof is thus omitted.

As illustrated in FIG. 3, a carbon dioxide capture apparatus 1 according to the third embodiment further includes a collection flow rate measuring part 70 configured to measure the flow rate of the regulating liquid 16 to be collected in the regulating liquid tank 52, and a supply flow rate meter (supply flow rate measuring part) 74 configured to measure the flow rate of the regulating liquid 16 to be supplied to the absorber 20 from the regulating liquid tank 52. In the third embodiment, the tank level gauge 53 is absent at the regulating liquid tank 52.

The collection flow rate measuring part 70 includes a cleaning water flow rate meter 71 configured to measure the flow rate of cleaning water 9, a first condensed water flow rate meter 72 configured to measure the flow rate of first condensed water 12, and a second condensed water flow rate meter 73 configured to measure the flow rate of second condensed water 14. The cleaning water flow rate meter 71 is provided in the branch line 28. Information about the flow rate of the cleaning water measured by the cleaning water flow rate meter 71 is transmitted to the controller 56. Similarly, Information about the flow rate of the first condensed water measured by the first condensed water flow rate meter 72 is transmitted to the controller 56, and information about the flow rate of the second condensed water measured by the second condensed water flow rate meter 73 is transmitted to the controller 56.

The supply flow rate meter 74 is provided between the regulating liquid control valve 55 and the absorber 20 in the third embodiment illustrated in FIG. 3. The supply flow rate meter 74, however, is not limited to this example; the supply flow rate meter 74 may be provided between the regulating liquid tank 52 and the regulating liquid control valve 55 as well.

The controller 56 according to the third embodiment controls the flow rate of the first condensed water 12 to be supplied to the regulating liquid tank 52, the flow rate of the second condensed water 14 to be supplied to the regulating liquid tank 52, and the flow rate of the cleaning water 9 to be supplied to the regulating liquid tank 52. This control is based on the flow rates of the regulating liquid 16 to be collected in the regulating liquid tank 52 and the flow rate, measured by the supply flow rate meter 74, of the regulating liquid 16 to be supplied to the absorber 20. The flow rates of the regulating liquid 16 to be corrected in the regulating liquid tank 52 is measured by the first condensed water flow rate meter 72, the second condensed water flow rate meter 73, and the cleaning water flow rate meter 71. Specifically, the controller 56 controls the temperature of the outlet of a first cooler 40, the temperature of the outlet of a second cooler 45, and the temperature of the outlet of a cleaning water cooler 25 so that the flow rate of the regulating liquid 16 to be collected in the regulating liquid tank 52 is equal to the flow rate of the regulating liquid 16 to be supplied to the absorber 20. The temperature of the outlet of the first cooler 40 is controlled by controlling the opening degree of a first cooling medium control valve 42 in the similar manner as in the first embodiment. Similarly, the temperature of the outlet of the second cooler 45 is controlled by controlling the opening degree of a second cooling medium control valve 47, and the temperature of the outlet of the cleaning water cooler 25 is controlled by controlling the opening degree of a cleaning cooling medium control valve 26.

If the flow rate of the regulating liquid 16 to be collected in the regulating liquid tank 52 becomes lower than the flow rate of the regulating liquid 16 to be supplied to the absorber 20, the controller 56 increases the opening degree of the first cooling medium control valve 42 and reduces the temperature of the outlet of the first cooler 40. This operation can raise the amount of the first condensed water 12 to be generated, and consequently raise the flow rate of the first condensed water 12 to be supplied to the regulating liquid tank 52.

Similarly, the controller 56 increases the opening degree of the second cooling medium control valve 47 and reduces the temperature of the outlet of the second cooler 45. This operation can increase the amount of the second condensed water 14 to be generated, and the flow rate of the second condensed water 14 to be supplied to the regulating liquid tank 52.

The controller 56 also increases the opening degree of the cleaning cooling medium control valve 26 and reduces the temperature of the outlet of the cleaning water cooler 25. This operation can increase the amount of the cleaning water 9, and the flow rate of the cleaning water 9 to be supplied to the regulating liquid tank 52.

On the other hand, if the flow rate of the regulating liquid 16 to be collected in the regulating liquid tank 52 becomes higher than the flow rate of the regulating liquid 16 to be supplied to the absorber 20, the controller 56 decreases the opening degree of the first cooling medium control valve 42 and increases the temperature of the outlet of the first cooler 40. This operation can reduce the amount of the first condensed water 12 to be generated, and the flow rate of the first condensed water 12 to be supplied to the regulating liquid tank 52. The second cooling medium control valve 47 and the cleaning cooling medium control valve 26 are controlled in the similar manner, so as to reduce the flow rate of the second condensed water 14 and the flow rate of the cleaning water 9 respectively.

Even if the flow rate of the regulating liquid 16 to be collected in the regulating liquid tank 52 is different from the flow rate of the regulating liquid 16 to be supplied to the absorber 20, the flow rates of the first condensed water 12, second condensed water 14, and cleaning water 9 supplied to the regulating liquid tank 52 are controlled. The regulating liquid 16 of an appropriate amount can be accordingly stored in the regulating liquid tank 52. For this reason, the regulating liquid 16 of an appropriate amount to control the proportion of water contained in the absorbing liquid can be stored in the regulating liquid tank 52.

According to the third embodiment, the controller 56 controls the temperature of the outlet of the first cooler 40, the temperature of the outlet of the second cooler 45, and the temperature of the outlet of the cleaning water cooler 25. This control is based on the flow rate of the regulating liquid 16 to be collected in the regulating liquid tank 52 and the flow rate of the regulating liquid 16 to be supplied to the absorber 20. This operation consequently can control the amount of the first condensed water 12 to be generated, the amount of the second condensed water 14 to be generated, and the amount of the cleaning water 9. It can further control the flow rates of the first condensed water 12, second condensed water 14, and cleaning water 9 supplied to the regulating liquid tank 52. This control is based on the flow rate of the regulating liquid 16 to be collected in the regulating liquid tank 52 and the flow rate of the regulating liquid 16 to be supplied to the absorber 20. The first condensed water 12, the second condensed water 14, and the cleaning water 9 each having an appropriate amount are consequently supplied to the regulating liquid tank 52. The regulating liquid 16 of an appropriate amount can be accordingly stored in the regulating liquid tank 52. Moreover, if the liquid level of the rich liquid 4 decreases, the regulating liquid 16 can be quickly supplied to the absorber 20 so that a variation in the proportion of water contained in the absorbing liquid can be quickly restrained.

The third embodiment describes the example in which the first condensed water 12, the second condensed water 14, and the cleaning water 9 are collected in the regulating liquid tank 52, and the controller 56 controls the temperature of the outlet of the first cooler 40, the temperature of the outlet of the second cooler 45, and the temperature of the outlet of the cleaning water cooler 25. This control is based on the flow rate of the regulating liquid 16 to be collected in the regulating liquid tank 52 and the flow rate of the regulating liquid 16 to be supplied to the absorber 20. The third embodiment, however, is not limited to this example. Although the first condensed water 12, the second condensed water 14, and the cleaning water 9 are collected in the regulating liquid tank 52, the controller 56 may control at least one of the temperature of the outlet of the first cooler 40, the temperature of the outlet of the second cooler 45, and the temperature of the outlet of the cleaning water cooler 25. The regulating liquid 16 of an appropriate amount in this case can also be stored in the regulating liquid tank 52.

The third embodiment has described the example in which the first condensed water 12 supplied from the first gas-liquid separator 41, the second condensed water 14 supplied from the second gas-liquid separator 46, and the cleaning water 9 in the washing unit 21 are collected as the regulating liquid 16 in the regulating liquid tank 52. The third embodiment, however, is not limited to this example; at least one of the first condensed water 12, the second condensed water 14, and the cleaning water 9 may be collected in the regulating liquid tank 52. The regulating liquid 16 in this case can also be stored in the regulating liquid tank 52. In addition, any two types of the first condensed water 12, the second condensed water 14, and the cleaning water 9 may be collected in the regulating liquid tank 52. Alternatively, the temperature of the outlet of a cooler corresponding to any of the two types of the water to be collected in the regulating liquid tank 52 may be controlled. Specifically, the controller 56 may control at least one of the temperature of the outlet of the first cooler 40 when the first condensed water 12 is collected in the regulating liquid tank 52, the temperature of the outlet of the second cooler 45 when the second condensed water 14 is collected in the regulating liquid tank 52, and the temperature of the outlet of the cleaning water cooler 25 when the cleaning water 9 is collected in the regulating liquid tank 52.

Fourth Embodiment

A carbon dioxide capture apparatus and carbon dioxide capture method according to a fourth embodiment of the invention will now be described with reference to FIG. 4.

Figure 4:
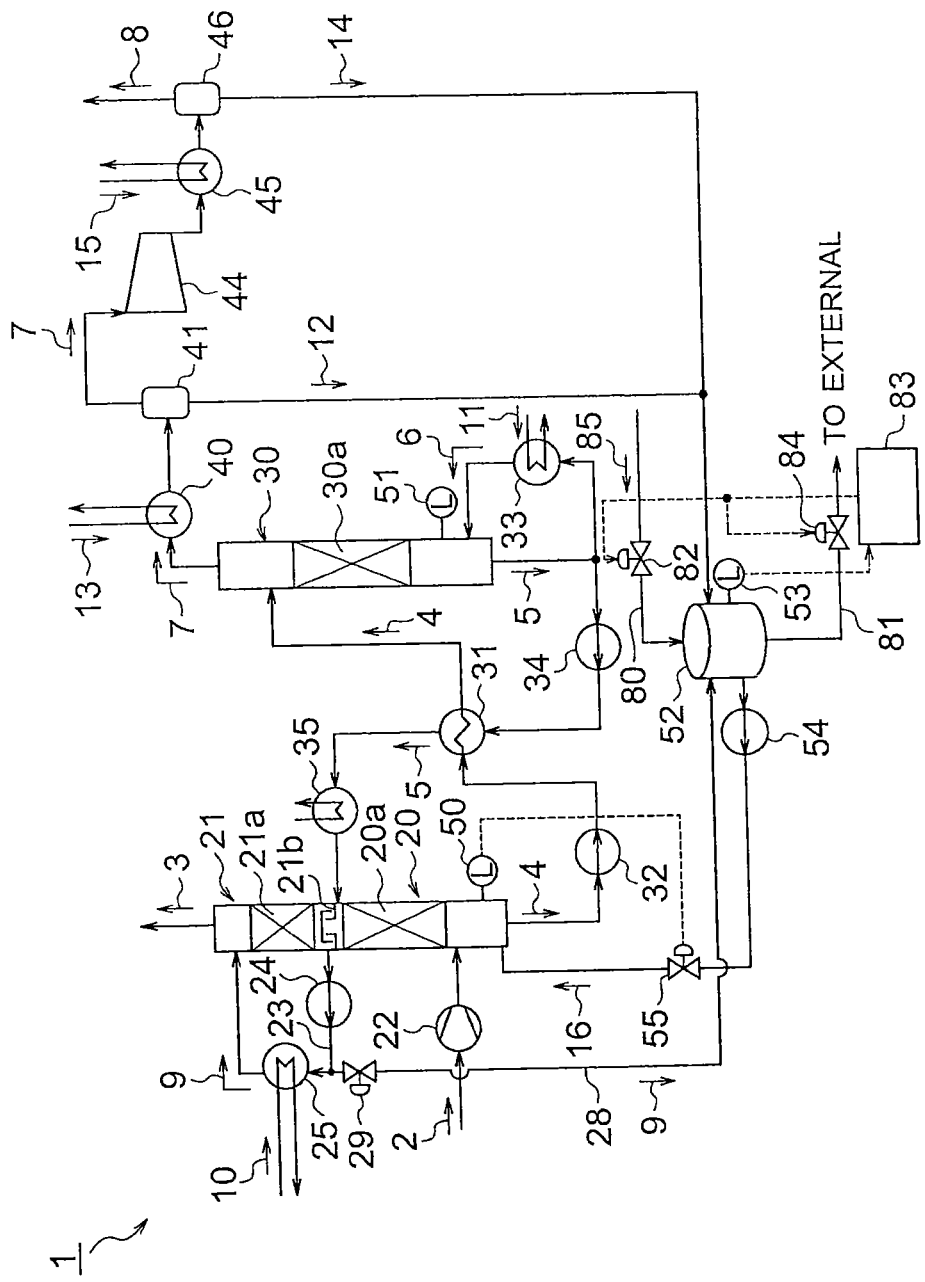
FIG. 4 is a diagram illustrating an overall configuration of a carbon dioxide capture apparatus according to a fourth embodiment of the invention.

The fourth embodiment illustrated in FIG. 4 provides a supplemental water supply line configured to supply supplemental water to the regulating liquid tank and a regulating liquid discharge line configured to discharge the regulating liquid from the regulating liquid tank. This feature is different from that in the first embodiment illustrated in FIG. 1, and other configurations are substantially the same as those in the first embodiment illustrated in FIG. 1. Parts that are illustrated in FIG. 4 and are the same as in the first embodiment illustrated in FIG. 1 are indicated by the same reference numerals and symbols as the first embodiment illustrated in FIG. 1. A detailed description thereof is thus omitted.

As illustrated in FIG. 4, a carbon dioxide capture apparatus 1 according to the fourth embodiment further includes a supplemental water supply line 80 configured to supply supplemental water 85 (water to be replenished to the regulating liquid tank 52) to the regulating liquid tank 52, and a regulating liquid discharge line 81 configured to discharge the regulating liquid 16 from the regulating liquid tank 52 to an external (outside the carbon dioxide capture apparatus 1). It is preferable that a supplemental water supply line 80 be coupled to a supplemental water supply source (not illustrated) provided in a plant having the carbon dioxide capture apparatus 1. If the supplemental water 85 of the supplemental water supply source is pressured, the pressure causes the supplemental water 85 to be supplied to the regulating liquid tank 52. With no pressure being applied to the supplemental water 85, in contrast, a pump (not illustrated) is preferably arranged in the supplemental water supply line 80. The fourth embodiment illustrated in FIG. 4 has no first cooling medium control valve 42, second cooling medium control valve 47, cleaning cooling medium control valve 26, first thermometer 43, second thermometer 48, nor cleaning water thermometer 27.

A supplemental water control valve 82 configured to control the flow rate of the supplemental water 85 to be supplied to the regulating liquid tank 52 is provided in the supplemental water supply line 80.

A controller 83 controls the opening degree of the supplemental water control valve 82 based on the liquid level of the regulating liquid 16 measured by the tank level gauge 53. Specifically, during the carbon dioxide capture apparatus 1 being operated, if the liquid level of the regulating liquid 16 within the regulating liquid tank 52 becomes lower than the predetermined criterion level, the controller 83 increases the opening degree of the supplemental water control valve 82. This operation can increase the flow rate of the supplemental water 85 to be supplied to the regulating liquid tank 52 from the supplemental water supply line 80. On the other hand, if the liquid level of the regulating liquid 16 within the regulating liquid tank 52 becomes higher than the predetermined criterion level, the controller 83 reduces the opening degree of the supplemental water control valve 82. This operation can reduce the flow rate of the supplemental water 85 to be supplied to the regulating liquid tank 52 from the supplemental water supply line 80. In this case, the supplemental water control valve 82 may be closed.

Even if the liquid level of the regulating liquid 16 within the regulating liquid tank 52 changes, the flow rate of the supplemental water 85 to be supplied to the regulating liquid tank 52 can be controlled based on the liquid level of the regulating liquid 16, and the regulating liquid 16 of an appropriate amount can be accordingly stored in the regulating liquid tank 52. Specifically, even if the liquid level of the regulating liquid 16 fluctuates, the liquid level of the regulating liquid 16 can be restored to the criterion level. The regulating liquid 16 of an appropriate amount to control the proportion of water contained in the absorbing liquid can be accordingly stored in the regulating liquid tank 52.

A regulating liquid discharge control valve 84 configured to control the flow rate of the regulating liquid 16 discharged from the regulating liquid tank 52 is provided in the regulating liquid discharge line 81.

The controller 83 controls the opening degree of the regulating liquid discharge control valve 84 based on the liquid level of the regulating liquid 16 measured by the tank level gauge 53. Specifically, during the carbon dioxide capture apparatus 1 being operated, if the liquid level of the regulating liquid 16 within the regulating liquid tank 52 becomes higher than the predetermined criterion level, the controller 83 increases the opening degree of the regulating liquid discharge control valve 84. This operation can increase the flow rate of the regulating liquid 16 discharged from the regulating liquid tank 52. On the other hand, if the liquid level of the regulating liquid 16 within the regulating liquid tank 52 becomes lower than the predetermined criterion level, the controller 83 decreases the opening degree of the regulating liquid discharge control valve 84. This operation can reduce the flow rate of the regulating liquid 16 discharged from the regulating liquid tank 52. In this case, the regulating liquid discharge control valve 84 may be closed.

Even if the liquid level of the regulating liquid 16 within the regulating liquid tank 52 changes, the flow rate of the regulating liquid 16 discharged from the regulating liquid tank 52 can be controlled based on the liquid level of the regulating liquid 16, and the regulating liquid 16 of an appropriate amount can be accordingly stored in the regulating liquid tank 52. Specifically, even if the liquid level of the regulating liquid 16 fluctuates, the liquid level of the regulating liquid 16 can be restored to the criterion level. The regulating liquid 16 of an appropriate amount to control the proportion of water contained in the absorbing liquid can be accordingly stored in the regulating liquid tank 52.

According to the fourth embodiment, the flow rate of the supplemental water 85 to be supplied to the regulating liquid tank 52 is controlled based on the liquid level of the regulating liquid 16 measured by the tank level gauge 53. This operation can control the flow rate of the supplemental water 85 to be supplied to the regulating liquid tank 52 based on the liquid level of the regulating liquid 16, and supply the regulating liquid 16 of an appropriate amount to the regulating liquid tank 52. The regulating liquid 16 of an appropriate amount can be accordingly stored in the regulating liquid tank 52. Moreover, if the liquid level of the rich liquid 4 decreases, the regulating liquid 16 can be quickly supplied to the absorber 20, so that a variation in the proportion of water contained in the absorbing liquid can be quickly restrained.

In addition, according to the fourth embodiment, the flow rate of the regulating liquid 16 discharged from the regulating liquid tank 52 is controlled based on the liquid level, measured by the tank level gauge 53, of the regulating liquid 16 within the regulating liquid tank 52. This operation can control the flow rate of the regulating liquid 16 discharged from the regulating liquid tank 52 based on the liquid level of the regulating liquid 16, and discharge the regulating liquid 16 of an appropriate amount from the regulating liquid tank 52. The regulating liquid 16 of an appropriate amount can be accordingly stored in the regulating liquid tank 52.

The fourth embodiment describes the example in which the carbon dioxide capture apparatus 1 includes the supplemental water supply line 80 and the regulating liquid discharge line 81. The fourth embodiment, however, is not limited to this example; one of the supplemental water supply line 80 and the regulating liquid discharge line 81 may be absent.

The fourth embodiment describes the example in which the first condensed water 12 discharged from the first gas-liquid separator 41, the second condensed water 14 discharged from the second gas-liquid separator 46, and the cleaning water 9 discharged from the washing unit 21 are collected as the regulating liquid 16 in the regulating liquid tank 52. The fourth embodiment, however, is not limited to this example; at least one of the first condensed water 12, the second condensed water 14, and the cleaning water 9 may be collected in the regulating liquid tank 52. In addition, any of the first condensed water 12, the second condensed water 14, and the cleaning water 9 may not be collected in the regulating liquid tank 52. In this case, the supplemental water 85 can be supplied to the regulating liquid tank 52 and stored as the regulating liquid 16 in the regulating liquid tank 52 so that the amount of the stored supplemental water 85 stored in the regulating liquid tank 52 can be appropriate. Moreover, if the liquid level of the rich liquid 4 decreases, the regulating liquid 16 can be quickly supplied to the absorber 20 so that a variation in the proportion of water contained in the absorbing liquid can be quickly restrained.

Figure 5:
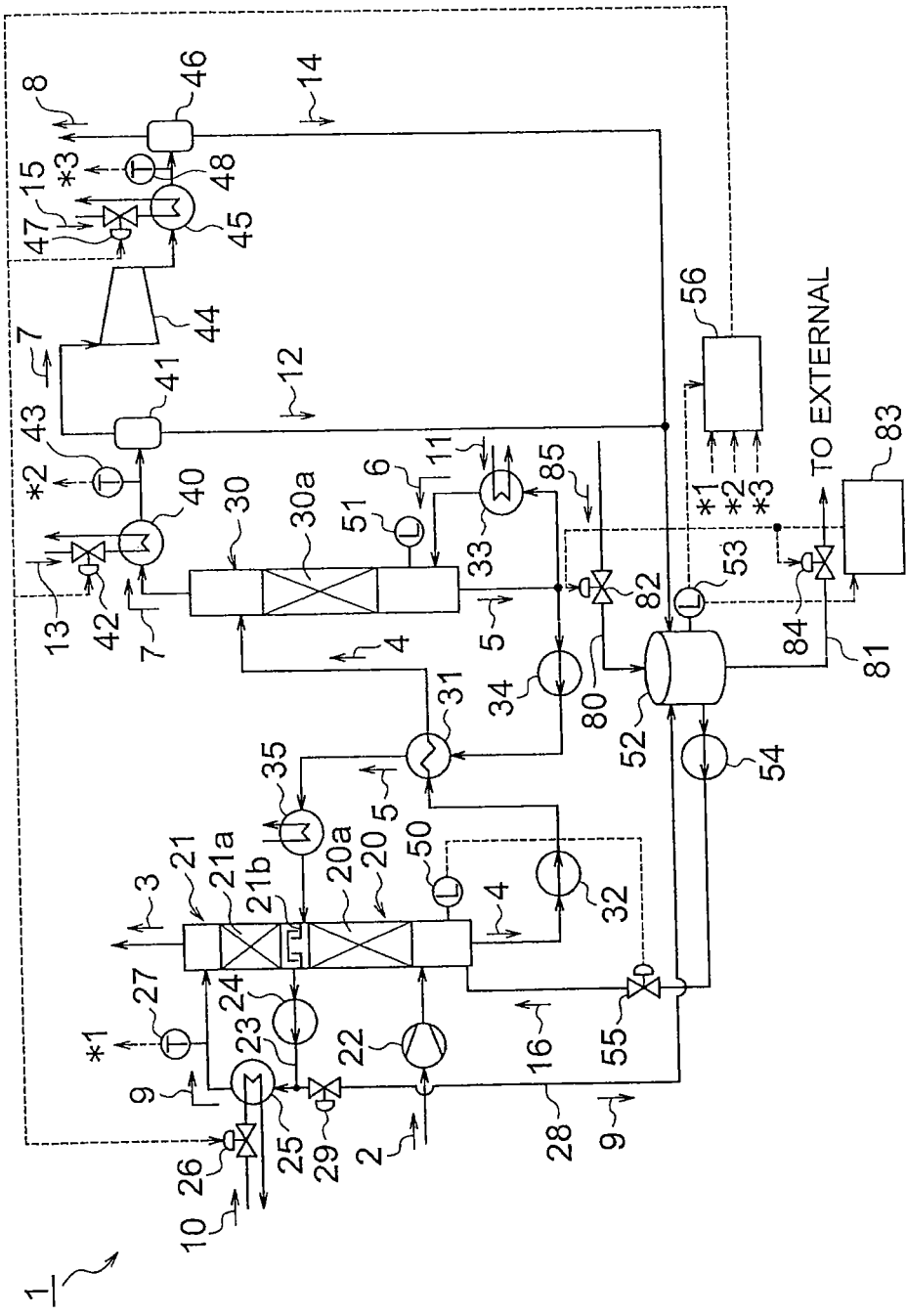
FIG. 5 is a diagram illustrating a modified example of FIG. 4.

The fourth embodiment has described the example in which the first cooling medium control valve 42, the second cooling medium control valve 47, the cleaning cooling medium control valve 26, the first thermometer 43, the second thermometer 48, and the cleaning water thermometer 27 are absent. The fourth embodiment, however, is not limited to this example. As illustrated in FIG. 5, the first cooling medium control valve 42, the second cooling medium control valve 47, the cleaning cooling medium control valve 26, the first thermometer 43, the second thermometer 48, and the cleaning water thermometer 27 may be arranged in the similar manner as in the first embodiment. The regulating liquid 16 of an appropriate amount in this case can be also stored in the regulating liquid tank 52. In FIG. 5, the controller 56 that is configured to control the opening degree of the first cooling medium control valve 42, the opening degree of the second cooling medium control valve 47, and the opening degree of the cleaning cooling medium control valve 26 is separate from the controller 83 configured to control the opening degree of the supplemental water control valve 82 and the opening degree of the regulating liquid discharge control valve 84. The fourth embodiment, however, is not limited to this structure; the controllers 56 and 83 may be combined as well.

Fifth Embodiment

A carbon dioxide capture apparatus and carbon dioxide capture method according to a fifth embodiment of the invention will now be described with reference to FIG. 6.

Figure 6:
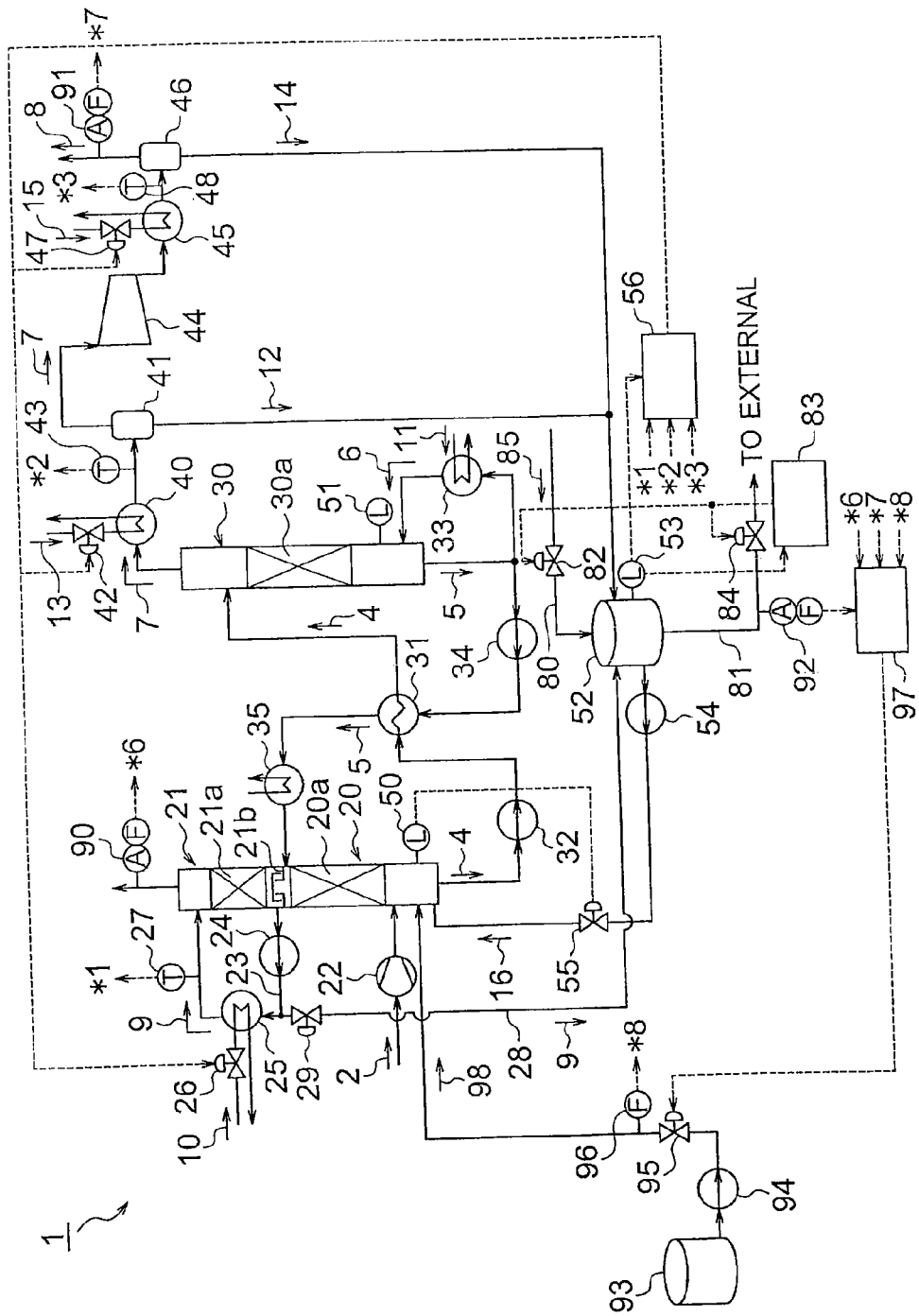
FIG. 6 is a diagram illustrating an overall configuration of a carbon dioxide capture apparatus according to a fifth embodiment of the invention.

The invention according to the fifth embodiment illustrated in FIG. 6 calculates the amount of an absorbing liquid component discharged from the carbon dioxide capture apparatus, and controls the flow rate of the supplemental water to be supplied to the absorber based on the calculated amount of the discharged absorbing liquid component. This feature is different from that in the first embodiment illustrated in FIG. 1, but other configurations are substantially the same as in the first embodiment illustrated in FIG. 1. Parts that are illustrated in FIG. 6 and are the same as those in the first embodiment illustrated in FIG. 6 are indicated by the same reference numerals and symbols as the first embodiment illustrated in FIG. 1. A detailed description thereof is thus omitted.

As illustrated in FIG. 6, a carbon dioxide capture apparatus 1 according to the fifth embodiment includes the supplemental water supply line 80, the supplemental water control valve 82, the regulating liquid discharge line 81, and the regulating liquid discharge control valve 84 are arranged in the similar manner as in the fourth embodiment.

The carbon dioxide capture apparatus 1 according to the fifth embodiment further includes an exhaust gas measuring part 90, a carbon dioxide gas measuring part 91, and a regulating liquid measuring part 92.

The exhaust gas measuring part 90 measures the flow rate of carbon dioxide-free exhaust gas 3 discharged from a washing unit 21 and the concentration of the absorbing liquid contained in the carbon dioxide-free exhaust gas 3. Information about the flow rate and about the concentration measured by the exhaust gas measuring part 90 are transmitted to a controller 97 (described later) as indicated by *6 in FIG. 6. In the exhaust gas measuring part 90, the flow rate meter and a concentration meter may be combined or may be separated.

The carbon dioxide gas measuring part 91 measures the flow rate of carbon dioxide gas 8 discharged from a second gas-liquid separator 46 and the concentration of the absorbing liquid contained in the carbon dioxide gas 8. Information about the flow rate and about the concentration measured by the carbon dioxide gas measuring part 91 are transmitted to the controller 97 as indicated by *7 in FIG. 6. In the carbon dioxide gas measuring part 91, the flow rate meter and a concentration meter may be combined or may be separated.

The regulating liquid measuring part 92 measures the flow rate of the regulating liquid 16 discharged from the regulating liquid discharge line 81 and the concentration of the absorbing liquid contained in the regulating liquid 16. Information about the flow rate and about the concentration measured by the regulating liquid measuring part 92 are transmitted to the controller 97. In the regulating liquid measuring part 92, the flow rate meter and a concentration meter may be combined or may be separated.

As illustrated in FIG. 6, a supplemental liquid tank 93 configured to store a supplemental liquid 98 containing at least an absorbing liquid component is coupled to the absorber 20. The supplemental liquid 98 can be a new absorbing liquid of a desired concentration. For example, the new absorbing liquid can have the same concentration as a criterion concentration (reference concentration) of the absorbing liquid circulating between the absorber 20 and the stripper 30. Alternatively, the new absorbing liquid can have a concentration (can be 100%) higher than the concentration of the absorbing liquid circulating between the absorber 20 and the stripper 30.

A supplemental liquid pump 94 (supplemental liquid supply driving unit) configured to supply the supplemental liquid 98 to the absorber 20 from the supplemental liquid tank 93 is provided between the supplemental liquid tank 93 and the absorber 20. The supplemental liquid 98 stored in the supplemental liquid tank 93 is supplied through the supplemental liquid pump 94 to the lower portion (specifically, the region located under the carbon dioxide capturer 20a) of the absorber 20. A supplemental liquid control valve 95 is arranged on the downstream (the absorber 20 side) of the supplemental liquid pump 94. The supplemental liquid control valve 95 controls the flow rate of the supplemental liquid 98 to be supplied through the supplemental liquid pump 94 to the absorber 20 from the supplemental liquid tank 93. In addition, a supplemental liquid flow rate meter 96 provided on the downstream of the supplemental liquid control valve 95 is used to measure the flow rate of the supplemental liquid 98 to be supplied to the absorber 20 from the supplemental liquid tank 93. Information about the flow rate, measured by the supplemental liquid flow rate meter 96, of the supplemental liquid is transmitted to the controller 97 as indicated by *8 in FIG. 6. The controller 97 determines in accordance with the flow rate, controlled by the supplemental liquid control valve 95, of the supplemental liquid 98, whether the supplemental liquid 98 is supplied to the absorber 20.

The controller 97 according to the fifth embodiment calculates the amount of the absorbing liquid component discharged from the carbon dioxide capture apparatus 1 in accordance with the values (or the flow rate of the carbon dioxide-free exhaust gas 3 and the concentration of the absorbing liquid) measured by the exhaust gas measuring part 90, the values (or the flow rate of the carbon dioxide gas 8 and the concentration of the absorbing liquid) measured by the carbon dioxide gas measuring part 91, and the values (or the flow rate of the regulating liquid 16 and the concentration of the absorbing liquid) measured by the regulating liquid measuring part 92. The controller 97 further controls the opening degree of the supplemental liquid control valve 95 based on the calculated amount of the absorbing liquid component. Specifically, the amount of the absorbing liquid component discharged together with the carbon dioxide-free exhaust gas 3 from the absorber 20 is calculated by multiplying the flow rate, measured by the exhaust gas measuring part 90, of the carbon dioxide-free exhaust gas 3 by the concentration of the absorbing liquid contained in the carbon dioxide-free exhaust gas 3. Similarly, the amount of the absorbing liquid component discharged together with the carbon dioxide gas 8 from the second gas-liquid separator 46 is calculated by multiplying the flow rate, measured by the carbon dioxide gas measuring part 91, of the carbon dioxide gas 8 by the concentration of the absorbing liquid contained in the carbon dioxide gas 8. The amount of the absorbing liquid component discharged together with the regulating liquid 16 from the regulating liquid tank 52 is calculated by multiplying the flow rate, measured by the regulating liquid measuring part 92, of the regulating liquid 16 by the concentration of the absorbing liquid contained in the regulating liquid 16.

The amount of the absorbing liquid component discharged from the carbon dioxide capture apparatus 1 is calculated by summing the amount of the absorbing liquid component discharged together with the carbon dioxide-free exhaust gas 3, the amount of the absorbing liquid component discharged together with the carbon dioxide gas 8, and the amount of the absorbing liquid component discharged together with the regulating liquid 16. The flow rate of the supplemental liquid 98 to be supplied to the absorber 20 from the supplemental liquid tank 93 is calculated based on the calculated amount of the discharged absorbing liquid component and the concentration of the supplemental liquid 98 stored in the supplemental liquid tank 93. The opening degree of the supplemental liquid control valve 95 is controlled based on the calculated flow rate of the supplemental liquid 98.

In FIG. 6, the controllers 56, 83, and 97 are separate. The controller 56 is configured to control the opening degree of the first cooling medium control valve 42, the opening degree of the second cooling medium control valve 47, and the opening degree of the cleaning cooling medium control valve 26. The controller 83 is configured to control the opening degree of the supplemental water control valve 82 and the opening degree of the regulating liquid discharge control valve 84. The controller 97 is configured to control the opening degree of the supplemental liquid control valve 95. The fifth embodiment, however, is not limited to this example. The controllers 56, 83, and 97 may be combined.

According to the fifth embodiment, the amount of the absorbing liquid component discharged from the carbon dioxide capture apparatus 1 is calculated based on the values measured by the exhaust gas measuring part 90, the values measured by the carbon dioxide gas measuring part 91, and the values measured by the regulating liquid measuring part 92. The flow rate of the supplemental liquid 98 to be supplied to the absorber 20 from the supplemental liquid tank 93 is accordingly controlled based on the calculated amount of the discharged absorbing liquid component. This operation can replenish the absorbing liquid component discharged from the carbon dioxide capture apparatus 1, and suppress the lower concentration of the absorbing liquid. In addition, the supplemental liquid 98 to be supplied to the absorber 20 is stored in the supplemental liquid tank 93. Thus, if the concentration of the absorbing liquid decreases, the supplemental liquid 98 can be quickly supplied to the absorber 20. It is therefore possible to quickly suppress the lower concentration of the absorbing liquid, the absorption performance, and the rate of capturing carbon dioxide.

The fifth embodiment describes the example in which the controller 97 calculates the amount of the absorbing liquid component discharged together with the carbon dioxide-free exhaust gas 3 based on the flow rate of the carbon dioxide-free exhaust gas 3 and the concentration of the absorbing liquid, measured by the exhaust gas measuring part 90. The fifth embodiment, however, is not limited to this example. If there is any particular relationship between the flow rate of the carbon dioxide-free exhaust gas 3 and the concentration of the absorbing liquid contained in the carbon dioxide-free exhaust gas 3, the amount of the discharged absorbing liquid component may be calculated using this relationship and either the flow rate or the concentration. In this case, it is sufficient if the exhaust gas measuring part 90 can measure the flow rate or concentration that is required for the calculation. The same applies to the carbon dioxide gas 8 and the regulating liquid 16.

The fifth embodiment has described the example in which the supplemental liquid 98 is supplied from the supplemental liquid tank 93 to the region located under the carbon dioxide capturer 20a of the absorber 20. The fifth embodiment, however, is not limited to this example. The supplemental liquid 98 may be supplied to a region between the carbon dioxide capturer 20a and the cleaning water storage unit 21b of the washing unit 21. In this case, for example, the supplemental liquid 98 may join the lean liquid 5 that has been discharged from the lean liquid cooler 35 before being supplied to the absorber 20 may be supplied to the absorber 20. In addition, the supplemental liquid 98 may be supplied to the lower portion (region located under the absorbing liquid regenerator 30a of the stripper 30) of the stripper 30 or may be supplied to the upper portion (region located above the absorbing liquid regenerator 30a) of the stripper 30.

Sixth Embodiment

A carbon dioxide capture apparatus and carbon dioxide capture method according to a sixth embodiment of the invention will now be described with reference to FIG. 7.

Figure 7:
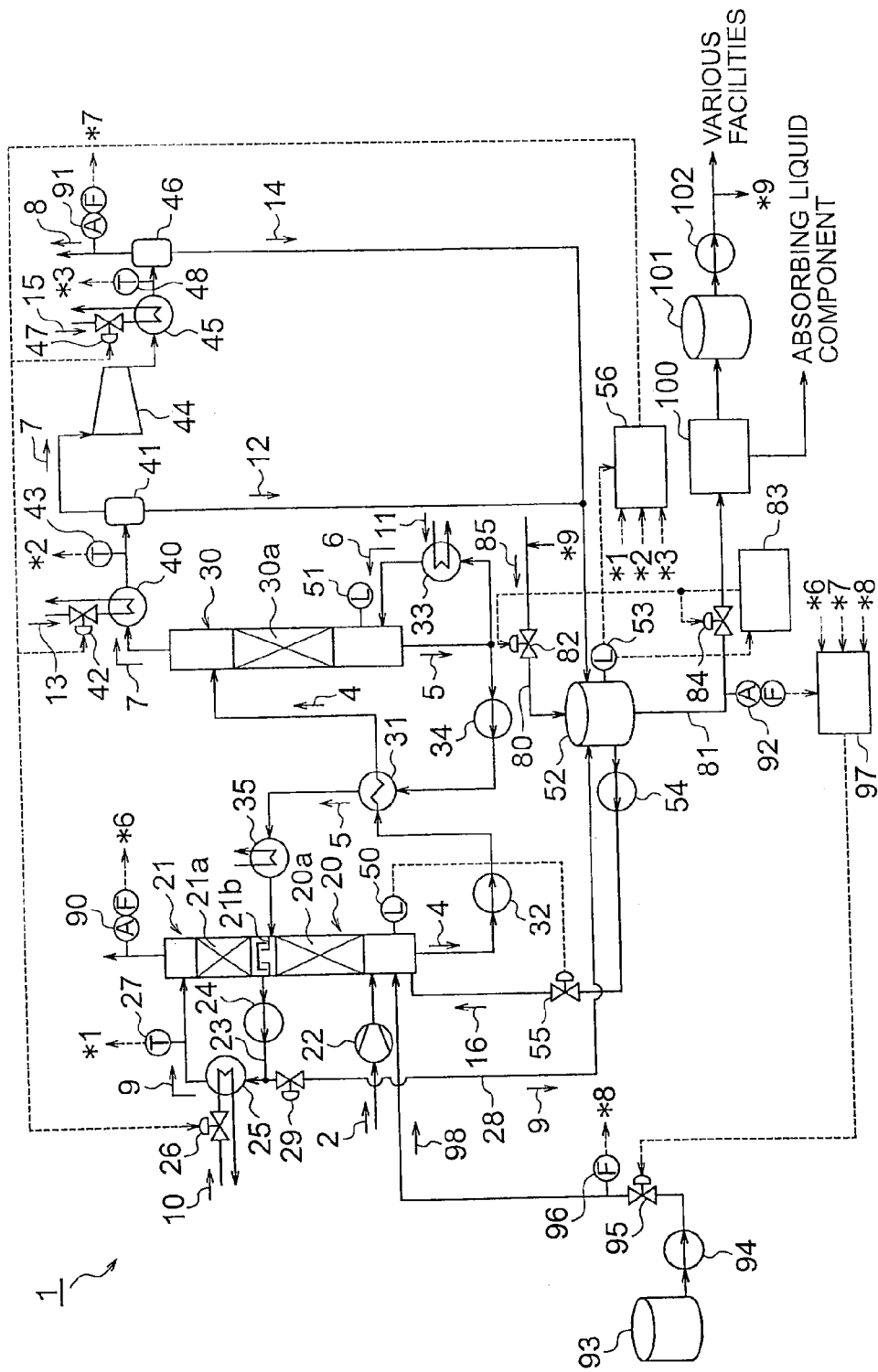
FIG. 7 is a diagram illustrating an overall configuration of a carbon dioxide capture apparatus according to a sixth embodiment of the invention.

A regulating liquid discharge line in the sixth embodiment illustrated in FIG. 7 includes a waste liquid treatment facility configured to separate an absorbing liquid component from a discharged regulating liquid. This feature is mainly different from that in the fifth embodiment illustrated in FIG. 6, and other configurations are substantially the same as those in the fifth embodiment illustrated in FIG. 6. Parts that are illustrated in FIG. 7 and are the same as in the fifth embodiment illustrated in FIG. 6 are indicated by the same reference numerals and symbols as the fifth embodiment illustrated in FIG. 6. A detailed description thereof is thus omitted.

As illustrated in FIG. 7, a waste liquid treatment facility 100 (component separation apparatus) configured to separate the absorbing liquid component from the discharged regulating liquid 16 is arranged on the downstream of the regulating liquid discharge control valve 84 in the regulating liquid discharge line 81. A treatment method used in the waste liquid treatment facility 100 is not limited to the following, although some examples of such a method can include a method employing an absorbent such as activated carbon, an electrodialytic treatment method, a method using ion-exchange resin, or a distillation method. These methods can be used to separate the absorbing liquid component from the regulating liquid 16. The separated absorbing liquid component is discharged from the waste liquid treatment facility 100 to the outside of the regulating liquid discharge line 81.

An irrigation water tank 101 is arranged on the downstream of the waste liquid treatment facility 100 in the regulating liquid discharge line 81. The regulating liquid 16 discharged from the waste liquid treatment facility 100 is supplied to and stored in an irrigation water tank 101.

An irrigation water pump 102 is arranged on the downstream of the irrigation water tank 101. The regulating liquid discharge line 81 is coupled to various facilities of the plant in which the carbon dioxide capture apparatus 1 is arranged.

Thus, the regulating liquid 16 stored in the irrigation water tank 101 is supplied to the various facilities.

In the sixth embodiment, the regulating liquid discharge line 81 is coupled to the supplemental water supply line 80. Thus, the regulating liquid 16 stored in the irrigation water tank 101 is supplied to the supplemental water supply line 80 as indicated by *9 in FIG. 7.

For example, during the carbon dioxide capture apparatus 1 being operated, if the liquid level of the regulating liquid 16 within a regulating liquid tank 52 becomes higher than the predetermined criterion level, the controller 83 increases the opening degree of the regulating liquid discharge control valve 84. This operation can increase the flow rate of the regulating liquid 16 discharged from the regulating liquid tank 52 to the regulating liquid discharge line 81. The discharged regulating liquid 16 is supplied to the waste liquid treatment facility 100, before the absorbing liquid component is separated from the regulating liquid 16. The regulating liquid 16 from which the absorbing liquid component is separated is then stored in the irrigation water tank 101 and supplied to the supplemental water supply line 80 after the storage. The regulating liquid 16 supplied to the supplemental water supply line 80 is subsequently supplied as supplemental water 85 to the regulating liquid tank 52 in accordance with the opening degree of the supplemental water control valve 82.

According to the sixth embodiment, the absorbing liquid component from the regulating liquid 16 discharged from the regulating liquid tank 52 to the regulating liquid discharge line 81 is separated, and the regulating liquid 16 is supplied to the supplemental water supply line 80. These operations can supply the regulating liquid 16 from which the absorbing liquid component is separated to the regulating liquid tank 52 for reuse. The absorbing liquid component contained in the regulating liquid 16 can be separated accordingly. When the amount of a deteriorated absorbing liquid component contained in the regulating liquid 16 is seemingly increasing, opening the regulating liquid discharge control valve 84 can remove the deteriorated absorbing liquid component from the regulating liquid 16. It is, therefore, possible to suppress the lower absorption performance and the rate of capturing carbon dioxide.

According to the aforementioned embodiments, a variation in the proportion of water contained in the absorbing liquid can be suppressed quickly and the lower rate of capturing carbon dioxide can be restrained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, it will be understood that these embodiments can be at least partially combined properly without departing from the spirit of the present invention.

The invention claimed is:

1. A carbon dioxide capture apparatus comprising:
an absorber configured to cause carbon dioxide contained in exhaust gas to be absorbed in an absorbing liquid;
a stripper configured to cause the carbon dioxide to be released from the absorbing liquid, supplied from the absorber, containing the absorbed carbon dioxide, the stripper being configured to discharge carbon dioxide-containing gas;
a first cooler configured to cool the carbon dioxide-containing gas discharged from the stripper and generate first condensed water;
a first gas-liquid separator configured to separate the first condensed water generated by the first cooler from the carbon dioxide-containing gas;
a compressor configured to compress the carbon dioxide-containing gas discharged from the first gas-liquid separator;
a second cooler configured to cool the carbon dioxide-containing gas discharged from the compressor and generate second condensed water;
a second gas-liquid separator configured to separate the second condensed water generated by the second cooler from the carbon dioxide-containing gas;
a washer arranged on an upper portion of the absorber and configured to use cleaning water to clean the exhaust gas from which the carbon dioxide is absorbed in the absorbing liquid;
an absorber level gauge configured to measure a liquid level of the absorbing liquid within the absorber;
a regulating liquid tank configured to store a regulating liquid that contains water, the regulating liquid being used to control a proportion of water contained in the absorbing liquid;
a regulating liquid supply driver configured to supply the regulating liquid from the regulating liquid tank to the absorber or the stripper;
a regulating liquid control valve configured to control a flow rate of the regulating liquid to be supplied from the regulating liquid tank to the absorber or the stripper; and
a controller configured to control an opening degree of the regulating liquid control valve based on the liquid level of the absorbing liquid measured by the absorber level gauge,
wherein the first condensed water, and at least one of the second condensed water and the cleaning water are collected as the regulating liquid in the regulating liquid tank.

2. The carbon dioxide capture apparatus according to claim 1, further comprising:
a cleaning cooler configured to cool the cleaning water;
a tank level gauge configured to measure a liquid level of the regulating liquid within the regulating liquid tank;
a first cooling medium control valve configured to control a flow rate of a first cooling medium to be supplied to the first cooler;
a second cooling medium control valve configured to control a flow rate of a second cooling medium to be supplied to the second cooler; and
a cleaning cooling medium control valve configured to control a flow rate of a cleaning cooling medium to be supplied to the cleaning cooler,
wherein the controller controls temperature of an outlet of the first cooler, and temperature of an outlet of the second cooler when the second condensed water is collected in the regulating liquid tank, or temperature of an outlet of the cleaning cooler when the cleaning water is collected in the regulating liquid tank, based on the liquid level of the regulating liquid measured by the tank level gauge.

3. The carbon dioxide capture apparatus according to claim 2,
wherein the controller controls an opening degree of the first cooling medium control valve to control the temperature of the outlet of the first cooler, controls the opening degree of the second cooling medium control valve to control the temperature of an outlet of the second cooler, and controls an opening degree of the cleaning cooling medium control valve to control the temperature of the outlet of the cleaning cooler.

4. The carbon dioxide capture apparatus according to claim 1, further comprising:
a tank level gauge configured to measure the liquid level of the regulating liquid within the regulating liquid tank;
a first pressure control valve configured to control a flow rate of the carbon dioxide-containing gas to be supplied to the second cooler from the first gas-liquid separator; and
a second pressure control valve configured to control a flow rate of carbon dioxide gas discharged from the second gas-liquid separator,
wherein the controller controls at least one of pressure within the first gas-liquid separator when the first condensed water is collected in the regulating liquid tank and pressure within the second gas-liquid separator when the second condensed water is collected in the regulating liquid tank, based on the liquid level of the regulating liquid measured by the tank level gauge.

5. The carbon dioxide capture apparatus according to claim 4,
wherein the controller controls an opening degree of the first pressure control valve to regulate the pressure within the first gas-liquid separator and controls an opening degree of the second pressure control valve to regulate the pressure within the second gas-liquid separator.

6. The carbon dioxide capture apparatus according to claim 1, further comprising:
a cleaning cooler configured to cool the cleaning water;
a collection flow rate measuring part configured to measure a flow rate of the regulating liquid to be collected in the regulating liquid tank; and
a supply flow rate measuring part configured to measure a flow rate of the regulating liquid to be supplied to the absorber from the regulating liquid tank,
wherein the controller controls at least one of temperature of an outlet of the first cooler when the first condensed water is collected in the regulating liquid tank, temperature of an outlet of the second cooler when the second condensed water is collected in the regulating liquid tank, and temperature of an outlet of the cleaning cooler when the cleaning water is collected in the regulating liquid tank, based on the flow rate, measured by the collection flow rate measuring part, of the regulating liquid to be collected in the regulating liquid tank and the flow rate, measured by the supply flow rate measuring part, of the regulating liquid to be supplied to the absorber.

7. The carbon dioxide capture apparatus according to claim 1, further comprising:
a supplemental water supply line configured to supply supplemental water to the regulating liquid tank;
a supplemental water control valve arranged in the supplemental water supply line and configured to control a flow rate of the supplemental water; and
a tank level gauge configured to measure a liquid level of the regulating liquid within the regulating liquid tank,
wherein the controller controls an opening degree of the supplemental water control valve based on the liquid level of the regulating liquid measured by the tank level gauge.

8. The carbon dioxide capture apparatus according to claim 7, further comprising:
a regulating liquid discharge line configured to discharge the regulating liquid from the regulating liquid tank; and
a regulating liquid discharge control valve arranged in the regulating liquid discharge line and configured to control a flow rate of the discharged regulating liquid,
wherein the controller controls an opening degree of the regulating liquid discharge control valve based on the liquid level of the regulating liquid measured by the tank level gauge.

9. The carbon dioxide capture apparatus according to claim 8, further comprising:
an exhaust gas measuring part configured to measure at least one of a flow rate of the exhaust gas discharged from the washer and concentration of the absorbing liquid contained in the exhaust gas;
a carbon dioxide gas measuring part configured to measure at least one of a flow rate of carbon dioxide gas discharged from the second gas-liquid separator and concentration of the absorbing liquid contained in the carbon dioxide gas;
a regulating liquid measuring part configured to measure at least one of a flow rate of the regulating liquid discharged from the regulating liquid discharge line and concentration of the absorbing liquid contained in the regulating liquid;
a supplemental liquid tank configured to store a supplemental liquid containing at least a component of the absorbing liquid; and
a supplemental liquid control valve configured to control flow rate of the supplemental liquid to be supplied by a supplemental liquid supply driver from the supplemental liquid tank to the absorber or the stripper,
wherein the controller calculates an amount of the component of the absorbing liquid to be discharged from the supplemental liquid tank based on a value measured by the exhaust gas measuring part, a value measured by the carbon dioxide gas measuring part, and a value measured by the regulating liquid measuring part, and then controls an opening degree of the supplemental liquid control valve based on the calculated amount of the component of the absorbing liquid to be discharged from the supplemental liquid tank.

10. The carbon dioxide capture apparatus according to claim 8, further comprising
a component separation apparatus arranged on a downstream of the regulating liquid discharge control valve in the regulating liquid discharge line and configured to separate the component of the absorbing liquid from the regulating liquid that is discharged from the supplemental liquid tank,
wherein the regulating liquid discharged from the component separation apparatus is supplied to the supplemental water supply line.

11. The carbon dioxide capture apparatus according to claim 1, further comprising:
a supplemental water supply line configured to supply supplemental water to the regulating liquid tank;

a supplemental water control valve arranged in the supplemental water supply line and configured to control a flow rate of the supplemental water; and a tank level gauge configured to measure a liquid level of the regulating liquid within the regulating liquid tank, wherein the controller controls an opening degree of the supplemental water control valve based on the liquid level, measured by the tank level gauge, of the regulating liquid.

12. The carbon dioxide capture apparatus according to claim 11, further comprising:

a regulating liquid discharge line configured to discharge the regulating liquid from the regulating liquid tank; and a regulating liquid discharge control valve arranged in the regulating liquid discharge line and configured to control a flow rate of the discharged regulating liquid, wherein the controller controls an opening degree of the regulating liquid discharge control valve based on the liquid level, measured by the tank level gauge, of the regulating liquid.

* * * * *